United States Patent
Horie et al.

(10) Patent No.: US 12,325,928 B2
(45) Date of Patent: Jun. 10, 2025

(54) ROUGHENED NICKEL-PLATED SHEET

(71) Applicant: TOYO KOHAN CO., LTD., Tokyo (JP)

(72) Inventors: Shinichirou Horie, Kudamatsu (JP); Etsuro Tsutsumi, Kudamatsu (JP); Toshifumi Koyanagi, Kudamatsu (JP); Koh Yoshioka, Kudamatsu (JP); Kyoko Takano, Kudamatsu (JP); Shunki Obata, Kudamatsu (JP); Satoko Harada, Kudamatsu (JP); Keishi Katsura, Kudamatsu (JP); Misato Ueno, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 412 days.

(21) Appl. No.: 17/794,509

(22) PCT Filed: Jan. 22, 2021

(86) PCT No.: PCT/JP2021/002333
§ 371 (c)(1),
(2) Date: Jul. 21, 2022

(87) PCT Pub. No.: WO2021/149821
PCT Pub. Date: Jul. 29, 2021

(65) Prior Publication Data
US 2023/0057775 A1     Feb. 23, 2023

(30) Foreign Application Priority Data

Jan. 22, 2020    (JP) .................................. 2020-008677

(51) Int. Cl.
*C25D 5/00*     (2006.01)
*C25D 5/36*     (2006.01)

(52) U.S. Cl.
CPC ............... *C25D 5/605* (2020.08); *C25D 5/36* (2013.01)

(58) Field of Classification Search
None
See application file for complete search history.

(56) References Cited

U.S. PATENT DOCUMENTS

| 2012/0111613 A1 | 5/2012 | Oguro et al. |
| 2015/0111057 A1 | 4/2015 | Taya et al. |
| 2016/0102414 A1 | 4/2016 | Tani et al. |

FOREIGN PATENT DOCUMENTS

| CN | 102471913 A | 5/2012 |
| CN | 104395506 A | 3/2015 |

(Continued)

OTHER PUBLICATIONS

Machine translation from EPO of JP2013095991A, translated Nov. 1, 2024. (Year: 2013).*

(Continued)

*Primary Examiner* — Elizabeth Collister
(74) *Attorney, Agent, or Firm* — Sughrue Mion, PLLC

(57) ABSTRACT

A roughened nickel-plated sheet including a roughened nickel layer on at least one surface of a metal substrate as the outermost layer thereof, the roughened nickel layer being formed of a plurality of nickel protrusions. When the structure of the roughened nickel-plated sheet is observed at height positions with a focused ion beam scanning electron microscope (FIB-SEM), the absolute value of the change rate of the nickel occupancy is equal to or less than a predetermined value, and the nickel occupancy and the number of nickel protrusions present at a height position located 2.0 μm from the base position of the roughened nickel layer toward the surface in the height direction are equal to or more than predetermined values, respectively.

16 Claims, 14 Drawing Sheets

(56) References Cited

FOREIGN PATENT DOCUMENTS

| | | | |
|---|---|---|---|
| CN | 105164321 A | | 12/2015 |
| JP | 2011-021216 A | | 2/2011 |
| JP | 2013095991 A | * | 5/2013 |
| JP | 2013-245394 A | | 12/2013 |
| JP | 5885345 B2 | | 3/2016 |
| JP | 2019-104949 A | | 6/2019 |
| JP | 2019104948 A | * | 6/2019 |

OTHER PUBLICATIONS

Machine translation from EPO of JP2019104948A translated Nov. 1, 2024. (Year: 2019).*
Chinese Office Action dated Mar. 15, 2023 in Chinese Application No. 202180009900.0.
Notice of Reasons for Refusal of Japanese Application No. 2021-531842 dated Oct. 12, 2021.
International Search Report of PCT/JP2021/002333 dated Mar. 23, 2021 [PCT/ISA/210].

* cited by examiner

Position where space is to be formed by etching

FIG. 11A
FIG. 11B
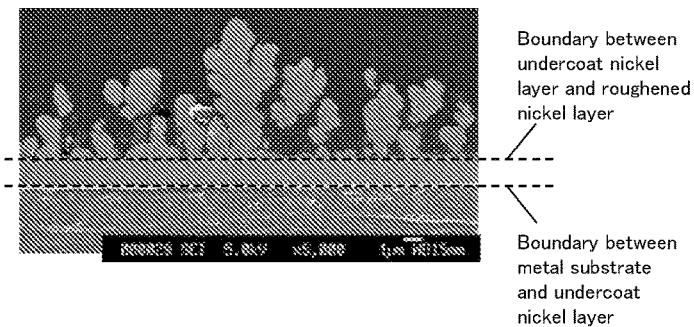
Boundary between undercoat nickel layer and roughened nickel layer
Boundary between metal substrate and undercoat nickel layer

ROUGHENED NICKEL-PLATED SHEET

CROSS REFERENCE TO RELATED APPLICATIONS

This application is a National Stage of International Application No. PCT/JP2021/002333, filed Jan. 22, 2021, claiming priority to Japanese Patent Application No. 2020-008677, filed Jan. 22, 2020.

TECHNICAL FIELD

The present invention relates to a roughened nickel-plated sheet including a roughened nickel layer as the outermost layer thereof.

BACKGROUND ART

Traditionally, nickel-plated steel sheets are used as members included in batteries and those included in electronic apparatuses and devices. When such nickel-plated steel sheets are bonded to other members, there are known methods of controlling the surface structures of the nickel-plated steel sheets to improve adhesion therebetween.

For example, Patent Document 1 discloses a surface-treated steel sheet including a nickel-plated layer foiled on a steel sheet, the nickel-plated layer having a fine structure having a particle density controlled to 2 to 500 particles/$\mu m^2$ and an average particle size controlled to 0.05 to 0.7 $\mu m$.

RELATED ART DOCUMENTS

Patent Document

Patent Document 1: Japanese Patent No. 5885345

SUMMARY OF THE INVENTION

Problem to be Solved by the Invention

However, in some cases, the surface-treated steel sheet disclosed in Patent Document 1 shows insufficient adhesion to other members depending on the type of the member, such as a film or a coating, bonded to the surface-treated steel sheet and the bonding method, and further improved adhesion has been demanded.

To solve this, a method of forming a nickel-plated layer by roughening plating can be considered to improve the adhesion to other members. However, the present inventors, who have conducted examination, have found that while the adhesion to other members can be improved by formation of a roughened nickel-plated layer by roughening plating, liquid permeation may occur at bonding interfaces in some cases.

An object of the present invention is to provide a roughened nickel-plated sheet having high adhesion of a plated layer to a substrate and high adhesion to other members, and having high anti-liquid permeability (suppression of liquid permeation at bonding interfaces, anti-liquid leakage properties) when bonded to other members.

Means for Solving Problems

The present inventors, who have conducted extensive research to achieve the above object, have found that according to first and second aspects below, a roughened nickel-plated sheet having high adhesion of a plated layer to a substrate and high adhesion to other members, and having high anti-liquid permeability when bonded to other members can be provided, and have completed the present invention.

In other words, the first aspect according to the present invention provides a roughened nickel-plated sheet comprising a roughened nickel layer on at least one surface of a metal substrate as the outermost layer thereof, the roughened nickel layer being famed of a plurality of nickel protrusions,
wherein when the roughened nickel-plated sheet is measured with a focused ion beam scanning electron microscope (FIB-SEM), and the structure of the roughened nickel layer at height positions is measured from images captured with the focused ion beam scanning electron microscope,
the absolute value $C_{rate(Ni90\%\_Ni50\%)}$ of the change rate of the nickel occupancy to the change amount in height from a height position $D_{Ni90\%}$ with a nickel occupancy of 90% to a height position $D_{Ni50\%}$ with a nickel occupancy of 50% is 65%/$\mu m$ or less,
the nickel occupancy $C_{2.0}$ at a height position located 2.0 $\mu m$ from a base position of the roughened nickel layer toward the surface in the height direction is 15% or more, and
the number $N_{2.0}$ of nickel protrusions present at the height position located 2.0 $\mu m$ from the base position toward the surface is 20 protrusions/136.5 $\mu m^2$ or more.

Moreover, a second aspect according to the present invention provides a roughened nickel-plated sheet comprising a roughened nickel layer on at least one surface of a metal substrate as the outermost layer thereof, the roughened nickel layer being famed of a plurality of nickel protrusions,
wherein when the roughened nickel-plated sheet is measured with a focused ion beam scanning electron microscope (FIB-SEM), and the structure of the roughened nickel layer at height positions is measured from images captured with the focused ion beam scanning electron microscope,
the average $R_{ave(Ni80\%\_Ni50\%)}$ of equivalent circle diameters of cross-sections of the nickel protrusions from a height position $D_{Ni80\%}$ with a nickel occupancy of 80% to a height position $D_{Ni50\%}$ with a nickel occupancy of 50% is 0.6 $\mu m$ or more,
the nickel occupancy $C_{2.0}$ at a height position located 2.0 $\mu m$ from a base position of the roughened nickel layer toward the surface in the height direction is 15% or more, and
the number $N_{2.0}$ of nickel protrusions present at the height position located 2.0 $\mu m$ from the base position toward the surface is 20 protrusions/136.5 $\mu m^2$ or more.

In the roughened nickel-plated sheets according to the first and second aspects of the present invention, the metal substrate is preferably a metal sheet or a metal foil made of one pure metal selected from the group consisting of, Fe, Cu, Al, and Ni or a metal sheet or a metal foil made of an alloy containing one metal selected from the group consisting of Fe, Cu, Al, and Ni.

In the roughened nickel-plated sheets according to the first and second aspects of the present invention, the metal substrate is preferably a steel sheet.

In the roughened nickel-plated sheets according to the first and second aspects of the present invention, the metal substrate preferably has a thickness of 0.01 to 2.0 mm.

Preferably, the roughened nickel-plated sheets according to according to the first and second aspects of the present invention further comprise an undercoat nickel layer on the metal substrate, wherein the roughened nickel layer is famed on the metal substrate with the undercoat nickel layer interposed therebetween.

In the roughened nickel-plated sheets according to the first and second aspects of the present invention, the amount of the nickel plating deposited is preferably 5.0 to 50.0 g/m$^2$.

Effects of Invention

The present invention can provide a roughened nickel-plated sheet having high adhesion of a plated layer to a substrate and high adhesion to other members, and having high anti-liquid permeability when bonded to other members.

BRIEF DESCRIPTION OF DRAWINGS

FIGS. 11A and 11B are diagrams illustrating the method of determining the boundary between the metal substrate and the undercoat nickel layer and the boundary between the undercoat nickel layer and the roughened nickel layer in Examples and Comparative Examples.

DESCRIPTION OF EMBODIMENTS

Figure 1A:
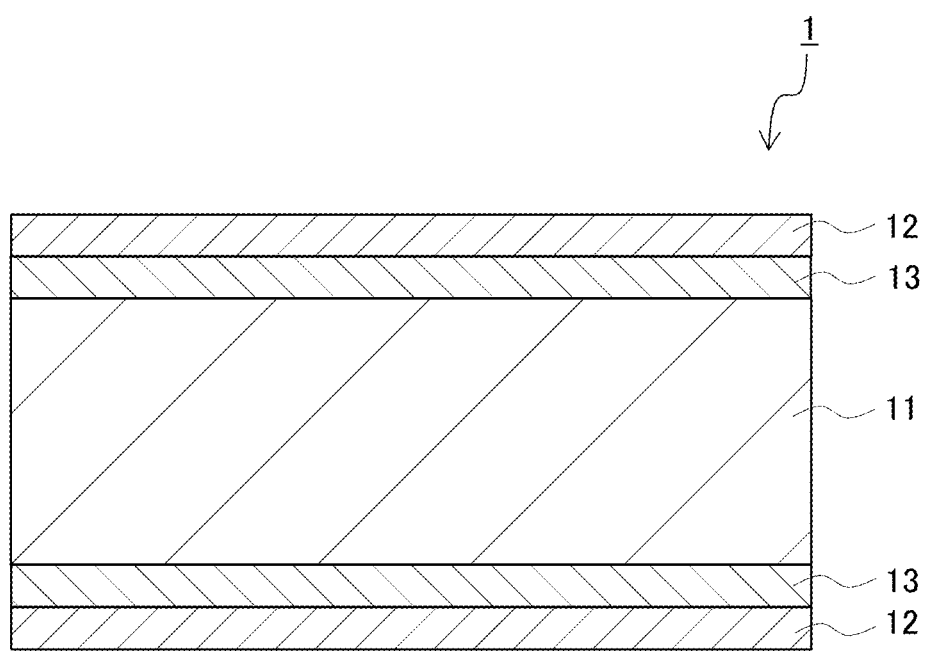
FIG. 1A is an illustration of the configuration of a roughened nickel-plated sheet according to the present embodiment.

FIG. 1A is a diagram showing the configuration of a roughened nickel-plated sheet 1 according to the present embodiment. As shown in FIG. 1A, the roughened nickel-plated sheet 1 according to the present embodiment includes a metal substrate 11, and a roughened nickel layer 12 famed thereon as the outermost layer with an undercoat nickel layer 13 interposed therebetween.

Figure 1B:
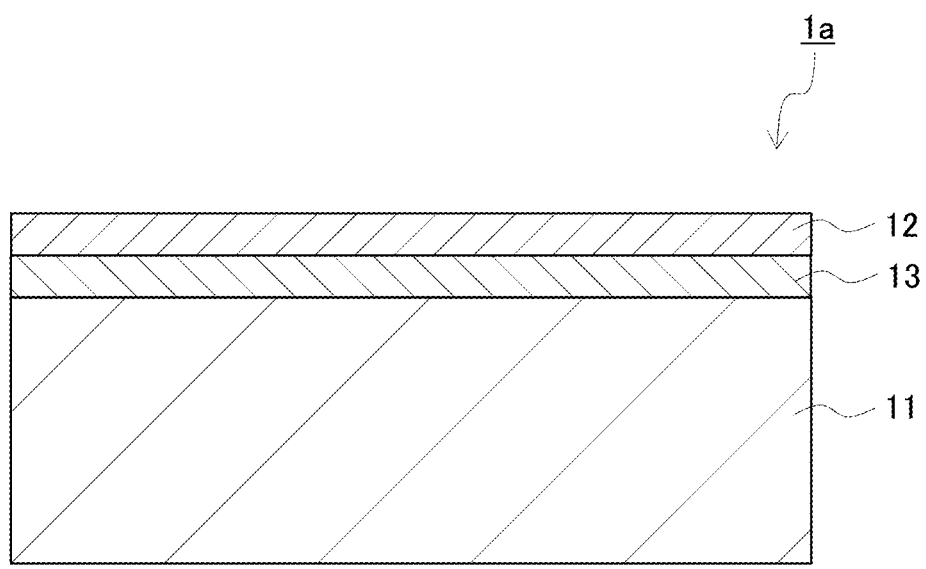
FIG. 1B is an illustration of the configuration of a roughened nickel-plated sheet according to another embodiment.

In the present embodiment, as shown in FIG. 1A, the roughened nickel-plated sheet 1 including the roughened nickel layer 12 famed on both surfaces of the metal substrate 11 with the undercoat nickel layer 13 interposed is shown as an example, but there is no limitation to such a configuration. For example, as in a roughened nickel-plated sheet 1a shown in FIG. 1B, the roughened nickel layer 12 may be famed on one surface of the metal substrate 11 with the undercoat nickel layer 13 interposed therebetween. Although FIGS. 1A and 1B illustrate the aspects including the undercoat nickel layer 13, according to another aspect, the roughened nickel layer 12 may be directly famed on the metal substrate 11 without the undercoat nickel layer 13.

<Metal Substrate 11>

Examples of the metal substrate 11 as the substrate for the roughened nickel-plated sheet 1 according to the present embodiment include, but should not be limited to, metal sheets or metal foils made of one pure metal selected from the group consisting of Fe, Cu, Al, and Ni, metal sheets or metal foils made of an alloy containing one metal selected from the group consisting of Fe, Cu, Al, and Ni, and the like. Specifically, the metal substrate 11 may be a steel sheet, an iron sheet, a stainless steel sheet, a copper sheet, an aluminum sheet, or a nickel sheet (these may be pure metals or alloys, and may be foils). Among these, preferred is a steel sheet or a copper sheet because these can be made easy to plate even by a relatively simple pre-plating treatment and favorably facilitate formation of a roughened nickel layer having high adhesion to the metal substrate. In particular, low carbon aluminum-killed steel (carbon content: 0.01 to 0.15% by weight), ultra-low carbon steel having a carbon content of 0.01% by weight or less (preferably 0.003% by weight or less), or non-aging ultra-low carbon steel prepared by adding Ti or Nb to ultra-low carbon steel is suitably used.

In the present embodiment, a steel sheet, a stainless steel sheet, a copper sheet, an aluminum sheet, or a nickel sheet, being prepared by acid washing a hot-rolled sheet of a metal substrate to remove scales (oxide film) on its surfaces, followed by cold rolling and then electrolytic cleaning of the rolling oil, can be used as a substrate. Those subjected to annealing or temper rolling after the electrolytic cleaning may also be used. In this case, annealing may be continuous annealing or batch annealing, and is not particularly limited. Besides, an electrolytic foil prepared by electrocasting, such as a copper foil, a nickel foil, or an iron foil, can also be used as the metal substrate. When a steel sheet is used as the metal substrate, desired is use of a steel sheet subjected to a planarization (smoothing) treatment of its surfaces to have an arithmetic average roughness Ra of 0.5 µm or less measured with a contact stylus type surface roughness meter, because further enhanced anti-liquid permeability can be imparted to products bonded with other members. Because a significantly smooth surface obstructs formation of roughened nickel plating, the arithmetic average roughness Ra of the metal substrate to be used is desirably 0.05 µm or more.

When a metal substrate, such as a stainless steel sheet or a nickel sheet, having a passivating film on its surfaces is used as the metal substrate 11, it is preferred that the metal substrate be subjected to nickel strike plating before a plating treatment to font a roughened nickel plating or an undercoat metal plating. Examples of the conditions for nickel strike plating include, but should not be limited to, the conditions below. Under the conditions below, the amount of nickel deposited by nickel strike plating is usually 0.08 to 0.89 g/m². When an undercoat nickel layer is famed, the total amount of the amount of nickel deposited by nickel strike plating and that of nickel deposited by nickel plating for forming the undercoat nickel layer is measured as the amount of nickel deposited to form the undercoat nickel layer.

bath composition: nickel sulfate hexahydrate: 100 to 300 g/L, sulfuric acid: 10 to 200 g/L
   pH: 1.0 or less
   bath temperature: 40 to 70° C.
   current density: 5 to 100 A/dm²
   plating time: 3 to 100 seconds The metal substrate 11 has a thickness of preferably 0.01 to 2.0 mm, more preferably 0.025 to 1.6 mm, still more preferably 0.025 to 0.3 mm, but not limited thereto. Although the metal substrate 11 has any roughness, the arithmetic average roughness Ra measured with a contact stylus type surface roughness meter is 0.05 to 0.9 µm, more preferably 0.05 to 0.5 µm, still more preferably 0.05 to 0.3 µm, particularly preferably 0.08 to 0.2 µm. The arithmetic average roughness Ra is measured according to JIS B 0601: 2013.

<Roughened Nickel Layer 12>

The roughened nickel layer 12 formed as the outermost surface of the roughened nickel-plated sheet 1 according to the present embodiment is a roughened plated layer foiled of a plurality of nickel protrusions, and when the roughened plated layer 12 is measured with a focused ion beam scanning electron microscope (FIB-SEM), the plurality of nickel protrusions forming the roughened nickel layer 12 has any one of the structures according to a first aspect and a second aspect described below.

Figure 2:
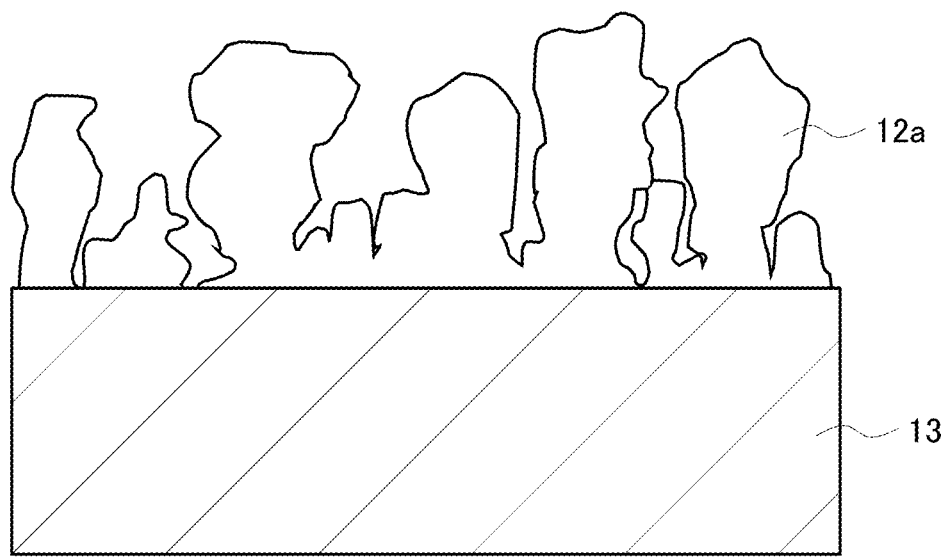
FIG. 2 is a diagram schematically showing the specific structure of a roughened nickel layer 12 according to the present embodiment.

Here, FIG. 2 is a diagram schematically showing the specific structure of the roughened nickel layer 12 according to the present embodiment. FIG. 2 illustrates a configuration in which the roughened nickel layer 12 is formed on the metal substrate 11 with the undercoat nickel layer 13 interposed therebetween. As illustrated in FIG. 2, the roughened nickel layer 12 is a roughening layer famed of a plurality of nickel protrusions 12a and having depressions and projections.

In the present embodiment, when the roughened nickel layer 12 formed of such a plurality of nickel protrusions 12a is measured with a focused ion beam scanning electron microscope (FIB-SEM), the plurality of nickel protrusions 12a has any one of the structures according to the first aspect and the second aspect described below.

Here, the focused ion beam scanning electron microscope (FIB-SEM) is an apparatus for observing an exposed cross-section from an image (referred to as "FIB-SEM image") obtained as follows (namely, an apparatus for measuring using the Slice & View method as a three-dimensional SEM observation method): A predetermined thickness of the roughened nickel layer 12 to be measured is milled with a focused ion beam (FIB) to expose cross-sections at predetermined thickness intervals, and images of the exposed cross-sections are captured with a scanning electron microscope (SEM). In one mode of the measurement using the Slice & View method as a three-dimensional SEM observation method, a predetermined thickness of the roughened nickel layer 12 as an analysis target may be milled from its surface to expose cross-sections at predetermined thickness intervals, and FIB-SEM images of the exposed cross-sections may be captured. Alternatively, in another mode thereof, a predetermined thickness of the roughened nickel layer 12 may be milled from the metal substrate 11 side to expose cross-sections at predetermined thickness intervals, and FIB-SEM images of the exposed cross-sections may be captured.

Figure 3A:
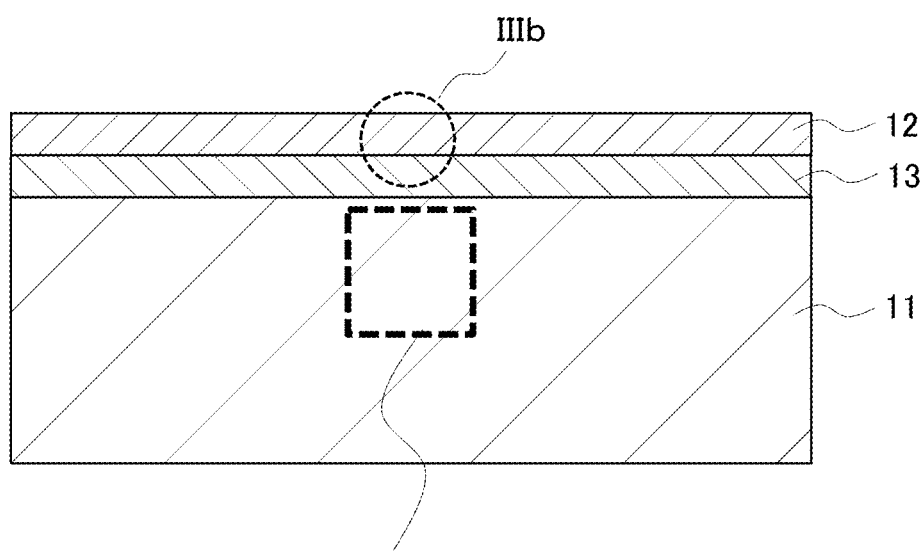
FIG. 3A is a diagram for illustrating a method of measuring the roughened nickel layer 12 using a focused ion beam scanning electron microscope (FIB-SEM).
Figure 3B:
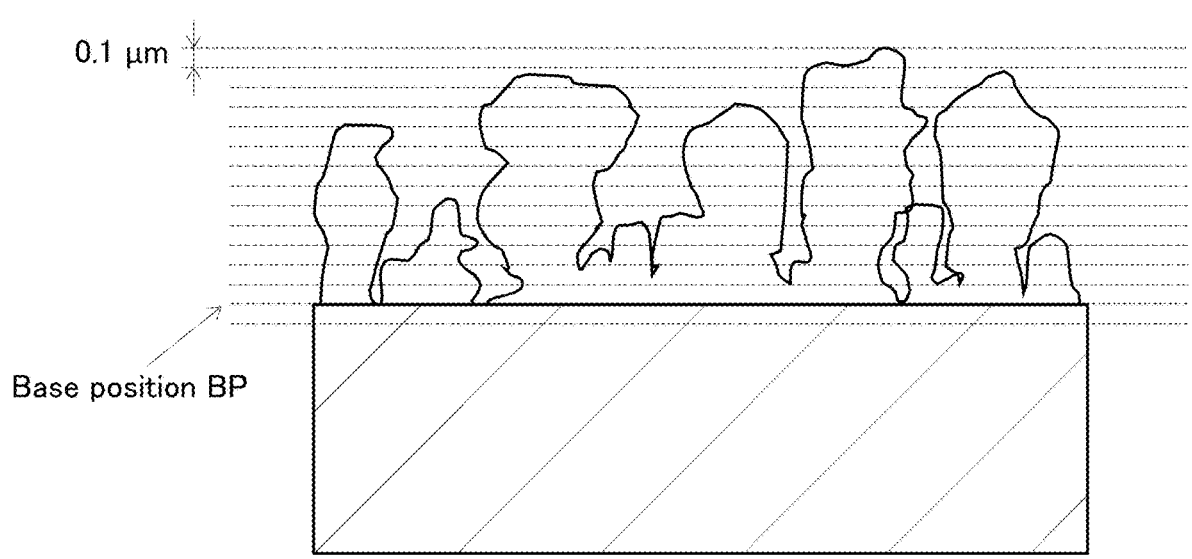
FIG. 3B is a diagram for illustrating the method of measuring the roughened nickel layer 12 using the focused ion beam scanning electron microscope (FIB-SEM).

For example, in a method of exposing cross-sections from the metal substrate 11 side at predetermined thickness intervals, and capturing FIB-SEM images of the exposed cross-sections, first, the roughened nickel-plated sheet 1 is buried in a resin, and a cross-section to be measured is exposed by polishing or the like. In the next step, the roughened nickel layer 12 as the analysis target is marked, and this sample for measurement is subjected to a treatment to give electroconductivity (e.g., by carbon deposition) as needed. Subsequently, as shown in FIG. 3A, the metal substrate 11 (or the undercoat nickel layer 13) is etched at a position sufficiently deeper than the marked roughened nickel layer 12 and as close as possible to the roughened nickel layer 12. By etching, a space for observation by the Slice & View method is formed. The space for observation famed by etching has a dimension large enough to measure the roughened nickel layer 12 by the Slice & View method. From the space for observation, the operation to mill a predetermined thickness, e.g., 0.1 µm, of the target by a focused ion beam (FIB) from the metal substrate 11 (or undercoat nickel layer 13) side toward the roughened nickel layer 12 and the operation to capture its FIB-SEM image with a scanning electron microscope (SEM) are repeated. Thus, FIB-SEM images are captured at predetermined thickness intervals. At this time, the observation with the scanning electron microscope (SEM) is performed at a predetermined angle (e.g., at an angle tilted by 52°) from the space for observation. The predetermined thickness (measurement pitch) at this time is not limited to 0.1 µm in particular, and is suitably selected from the range of 0.08 to 0.18 µm. As shown in FIG. 3B, the FIB-SEM images of the measured cross-sections are captured. In other words, as shown in FIG. 3B, the FIB-SEM images of the measured cross-sections are captured from the base position BP in the height direction with a predetermined pitch (e.g., a pitch of 0.1 µm as shown by the dashed line in FIG. 3B). FIG. 3B is a diagram for illustrating the method of measuring the roughened nickel layer 12 with a focused ion beam scanning electron microscope (FIB-SEM), and shows an enlarged diagram of a portion IIIb in FIG. 3A.

Figure 4A:
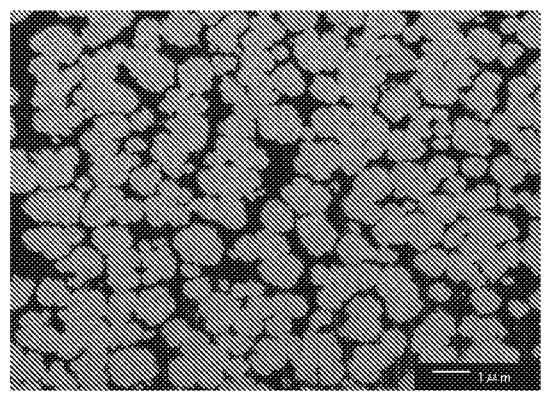
FIG. 4A is an FIB-SEM image in Example 1 at a height position with a nickel occupancy of 70%.
Figure 4B:
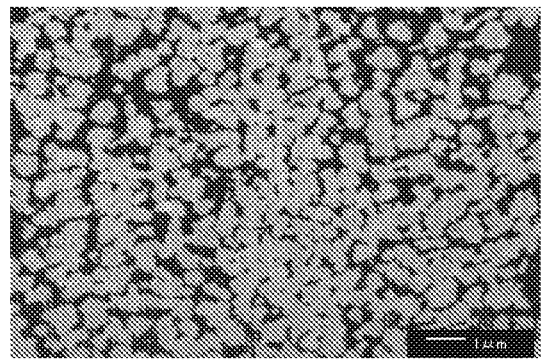
FIG. 4B is an FIB-SEM image in Comparative Example 1 at a height position with a nickel occupancy of 70%.

In the next step, such an operation (Slice) to mill a predetermined thickness and the observation (View) by SEM are repeated with a pitch of 0.1 μm, and such measurement is performed until the nickel occupancy in the FIB-SEM image (i.e., the proportion of nickel occupying the FIB-SEM image) reaches 0% (namely, performed until nickel is no longer observed across the FIB-SEM image (until the roughened nickel layer 12 is completely milled)) Here, FIG. 4A shows one example of the FIB-SEM images captured in the present embodiment. FIG. 4A shows an FIB-SEM image in Example 1 at a height position with a nickel occupancy of 70%. FIG. 4B shows an FIB-SEM image in Comparative Example 1 at a height position with a nickel occupancy of 70%.

In the present embodiment, the FIB-SEM images of the cross-sections at the respective heights (namely, FIB-SEM images of the cross-sections obtained every 0.1 μm height, for example) are captured with a focused ion beam scanning electron microscope (FIB-SEM), and the nickel occupancy, the number of nickel protrusions 12a, and the equivalent circle diameters of the nickel protrusions 12a are determined in the FIB-SEM images of the cross-sections at the respective heights. Here, the nickel occupancy is the proportion of nickel within an observation field (specifically, 136.5 μm$^2$=13 μm×10.5 μm), and the number of nickel protrusions 12a is the number of nickel protrusions 12a (unit: "protrusions/136.5 μm$^2$") within an observation field (specifically, 136.5 μm$^2$). The equivalent circle diameters of the nickel protrusions 12a are determined as follows: For the nickel protrusions 12a present within the observation fields of the FIB-SEM images at the respective height positions, the area of the cross-section of each nickel protrusion is determined, and the diameter of a circle (perfect circle) having the same area as that of the cross-section is determined by calculation.

In the present embodiment, the base position BP of the roughened nickel layer 12 in the height direction is determined from the FIB-SEM images of the cross-sections at the respective heights obtained in the measurement with a focused ion beam scanning electron microscope (FIB-SEM). Specifically, when the roughened nickel layer 12 formed of a plurality of nickel protrusions 12a is subjected to FIB-SEM measurement, the nickel occupancy in the FIB-SEM image is 100% at the height position closest to the substrate while the nickel occupancy in the FIB-SEM image tends to gradually reduce as the height position becomes closer to the surface. In the present embodiment, when the nickel occupancy is examined sequentially from the substrate side in the FIB-SEM images obtained by the measurement, a position at which the nickel occupancy reaches less than 99% for the first time (namely, the height position which has a nickel occupancy of less than 99% and is located closest to the substrate) is defined as the base position BP of the roughened nickel layer 12. In the present embodiment, the portion extending from the base position BP to the surface is considered as the roughened nickel layer 12. Here, FIG. 5A is a graph showing the relation between the position from the base position BP of the roughened nickel layer 12 in Example 1 and the nickel occupancy within the observation field.

First Aspect

In the first aspect according to the present embodiment, the roughened nickel layer 12 satisfies the conditions (1) to (3):
(1) The absolute value $C_{rate(Ni90\%\_Ni50\%)}$ of the change rate of the nickel occupancy to the change amount in height from a height position $D_{Ni90\%}$ with a nickel occupancy of 90% to a height position $D_{Ni50\%}$ with a nickel occupancy of 50% is 65%/μm or less;
(2) The nickel occupancy $C_{2.0}$ at the height position located 2.0 μm from the base position BP toward the surface is 15% or more; and
(3) The number $N_{2.0}$ of nickel protrusions 12a present at the height position located 2.0 μm from the base position BP toward the surface is 20 protrusions/136.5 μm$^2$ or more.

Figure 5A:
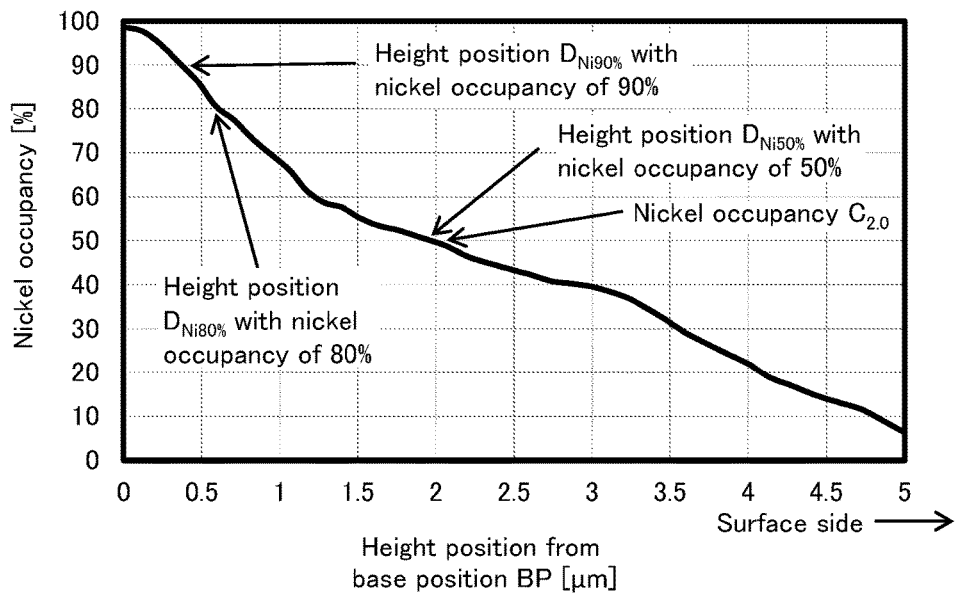
FIG. 5A is a graph showing the relation between the position in the roughened nickel layer 12 in Example 1 from the base position BP and the nickel occupancy in the roughened nickel layer 12 within the observation field.

Here, FIG. 5A is a graph showing the relation between the position from the base position BP of the roughened nickel layer 12 in Example 1 and the nickel occupancy within the observation field. As shown in the graph of FIG. 5A, the condition (1) defines the absolute value $C_{rate(Ni90\%\_Ni50\%)}$ of the rate of the change in nickel occupancy to the change in height from the height position $D_{Ni90\%}$ with a nickel occupancy of 90% to the height position $D_{Ni50\%}$ with a nickel occupancy of 50%. In the present embodiment, the absolute value $C_{rate(Ni90\%\_Ni50\%)}$ of the rate of the change in nickel occupancy to the change in height is within the range of 65%/μm or less. In Example 1 shown in FIG. 5A, the absolute value $C_{rate(Ni90\%\_Ni50\%)}$ of the rate of the change in nickel occupancy to the change in height is 25.6%/μm. In the present embodiment, an exemplary configuration has been described in which the undercoat nickel layer 13 is disposed as a layer below the roughened nickel layer 12. When the roughened nickel layer 12 is formed directly on the metal substrate 11 or with a different undercoat layer other than the undercoat nickel layer 13 being interposed, a metal other than nickel may be contained. In the present embodiment, the meaning of "nickel occupancy" encompasses nickel and other metals (in other words, the "nickel occupancy" in this case is exchangeable to "metal occupancy").

In the first aspect, the absolute value $C_{rate(Ni90\%\_Ni50\%)}$ of the change rate of the nickel occupancy to the change amount in height is determined from the following expression (a). In the first aspect, the absolute value $C_{rate(Ni90\%\_Ni50\%)}$ of the change rate of the nickel occupancy to the change amount in height is 65%/μm or less, preferably 10 to 65%/μm, more preferably 15 to 60%/μm, still more preferably 15 to 55%/μm, particularly preferably 26 to 55%/μm.

Absolute value $C_{rate(Ni90\%\_Ni50\%)}$ of change rate of nickel occupancy to change in height=|[(nickel occupancy (%) at height position $D_{Ni90\%}$ with nickel occupancy of 90%)−(nickel occupancy (%) at height position $D_{Ni50\%}$ with nickel occupancy of 50%)]÷[(height position $D_{Ni90\%}$ (μm) from base position BP with nickel occupancy of 90%)−(height position $D_{Ni50\%}$ (μm) from base position BP with nickel occupancy of 50%)]|    (Expression α)

When due to the pitch for measurement, data of the height position where the nickel occupancy is exactly 90% or data of the height position where the nickel occupancy is exactly 50% cannot be obtained for the calculation of the absolute value $C_{rate(Ni90\%\_Ni50\%)}$ of the change rate of the nickel occupancy, the data of a height position closest to the desired height position may be used, and may be subjected to approximation processing or the like.

As shown in the graph of FIG. 5A, the condition (2) defines the nickel occupancy $C_{2.0}$ at a height position located 2.0 μm from the base position BP toward the surface. In the present embodiment, the nickel occupancy $C_{2.0}$ is 15% or more. In Example 1 shown in FIG. 5A, the nickel occupancy $C_{2.0}$ is 48.9%. In the first aspect, the nickel occupancy $C_{2.0}$ is 15% or more, preferably 17% or more, more preferably 20% or more, still more preferably 28% or more. The upper limit of the nickel occupancy $C_{2.0}$ is not particularly limited, and is usually 80% or less.

Figure 5B:
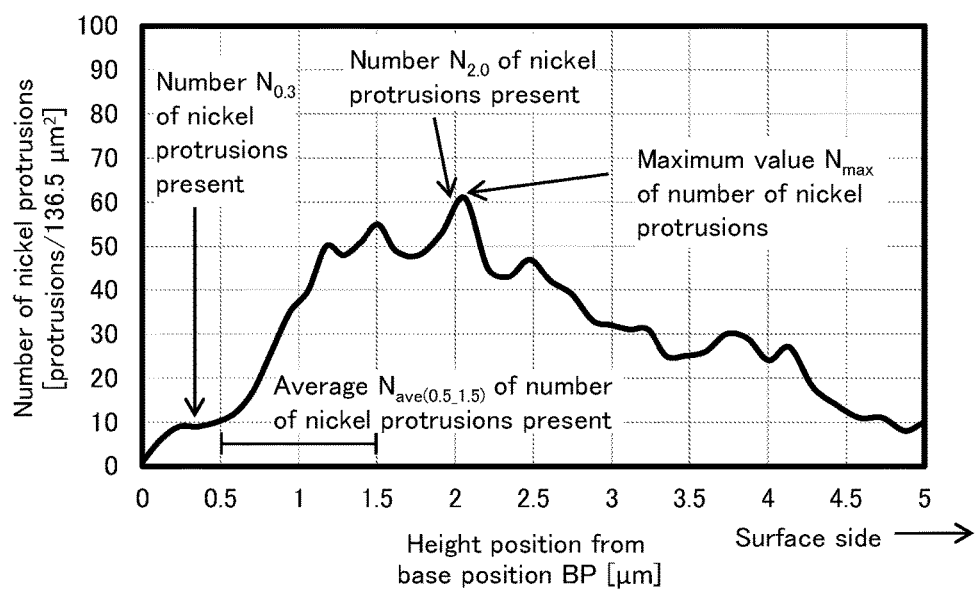
FIG. 5B is a graph showing the relation between the position in the roughened nickel layer 12 in Example 1 from the base position BP and the number of nickel protrusions 12a within the observation field.

Furthermore, the graph of FIG. 5B also shows the relation between the position of the roughened nickel layer 12 in Example 1 from the base position BP and the number of nickel protrusions 12a within the observation field. As shown in the graph of FIG. 5B, the condition (3) defines the number $N_{2.0}$ of nickel protrusions 12a present at a height position located 2.0 μm from the base position BP toward the surface. In the present embodiment, the number $N_{2.0}$ of nickel protrusions 12a present is 20 protrusions/136.5 μm² or more. In Example 1 shown in FIG. 5B, the number $N_{2.0}$ of nickel protrusions 12a present is 61 protrusions/136.5 μm². In the first aspect, the number $N_{2.0}$ of nickel protrusions 12a present is 20 protrusions/136.5 μm² or more, preferably 25 protrusions/136.5 μm² or more, more preferably 30 protrusions/136.5 μm² or more. The upper limit of the number $N_{2.0}$ of nickel protrusions 12a present is not particularly limited, and is usually 150 protrusions/136.5 μm² or less.

To ensure adhesion to other members, desired is a structure having a plurality of nickel protrusions such that the nickel occupancy (i.e., the proportion of nickel protrusions 12a) and the number of nickel protrusions 12a at a predetermined height or higher from the substrate 11 fall within predetermined ranges. For this reason, to provide favorable adhesion to other members, in the present embodiment, the nickel occupancy $C_{2.0}$ and the number $N_{2.0}$ of nickel protrusions 12a present at a height position located 2.0 μm from the base position BP toward the surface are focused. Specifically, the nickel occupancy $C_{2.0}$ is 15% or more, and the number $N_{2.0}$ of nickel protrusions 12a present is 20 protrusions/136.5 μm² or more.

Second Aspect

In the second aspect according to the present embodiment, in addition to the conditions (2) and (3) described above, the roughened nickel layer 12 satisfies the condition (4):
(4) The average $R_{ave(Ni80\%\_Ni50\%)}$ of the equivalent circle diameters of the cross-sections of the nickel protrusions from the height position $D_{Ni80\%}$ with a nickel occupancy of 80% to the height position $D_{Ni50\%}$ with a nickel occupancy of 50% is 0.6 μm or more.

Figure 6A:
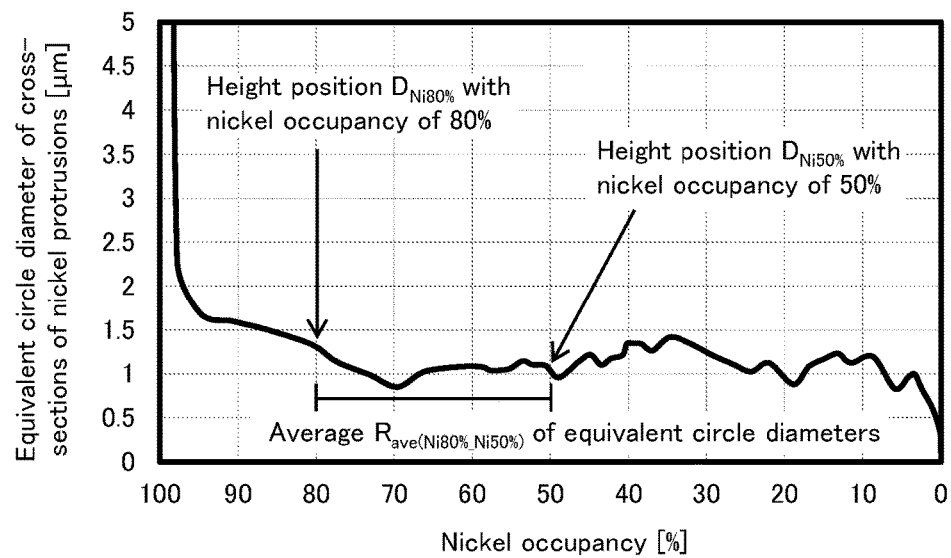
FIG. 6A is a graph showing the relation between the nickel occupancy in the roughened nickel layer 12 in Example 1 within the observation field and the equivalent circle diameter of the cross-sections of the nickel protrusions 12a observed within the observation field.

FIG. 6A shows a graph showing the relation between the nickel occupancy in the roughened nickel layer 12 in Example 1 within the observation field and the equivalent circle diameter of the cross-sections of the nickel protrusions 12a observed within the observation field. As shown in the graph of FIG. 6A, the condition (4) defines the average $R_{ave(Ni80\%\_Ni50\%)}$ of the equivalent circle diameters of the cross-sections of the nickel protrusions 12a from the height position $D_{Ni80\%}$ with a nickel occupancy of 80% to the height position $D_{Ni50\%}$ with a nickel occupancy of 50%. In the present embodiment, the average $R_{ave(Ni80\%\_Ni50\%)}$ of the equivalent circle diameters is 0.6 μm or more. In Example 1 shown in FIG. 6A, the average $R_{ave(Ni80\%\_Ni50\%)}$ of the equivalent circle diameters is 1.08 μm. In the first aspect, the average $R_{ave(Ni80\%\_Ni50\%)}$ of the equivalent circle diameters is in the range of 0.6 μm or more, preferably 0.6 to 2.2 μm, more preferably 0.6 to 2.0 μm, still more preferably 0.6 to 1.8 μm, particularly preferably 0.6 to 1.6 μm.

In the present embodiment, by controlling the structure of a plurality of nickel protrusions 12a forming the roughened nickel layer 12 which can be determined with a focused ion beam scanning electron microscope (FIB-SEM) to any one of the structure of the first aspect and that of the second aspect, the roughened nickel layer 12 can have increased adhesion to the metal substrate 11 and increased adhesion to other members, and can effectively suppress liquid permeation at bonding interfaces when bonded to other members, demonstrating high anti-liquid permeability.

Figure 7:
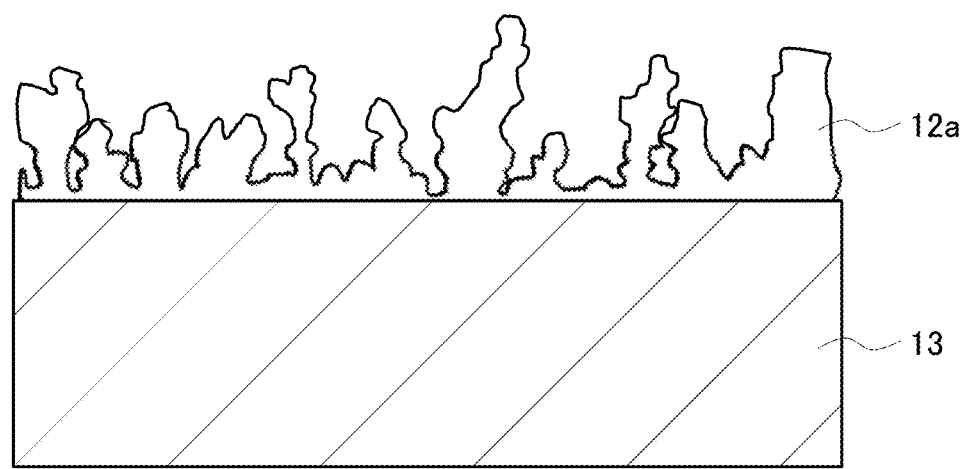
FIG. 7 is a diagram schematically showing the specific structure of the roughened nickel layer according to Comparative Examples.

In particular, the present inventors, who have conducted extensive research focusing on an improvement in anti-liquid permeability and on the structure of a plurality of nickel protrusions 12a forming the roughened nickel layer 12, have found that when liquid permeation at bonding interfaces with other members is more likely to occur if gaps between nickel protrusions 12a are relatively wide as shown in FIG. 7. The present inventors also have found that occurrence of such liquid permeation at bonding interfaces causes a problem (sealing failure) that a liquid undesirably permeates at the interfaces between the roughened nickel-plated sheet 1 and other members bonded thereto when the resulting bonded products are used while the ends of other members are in contact with the liquid; and also have found that for example, when the resulting bonded products are used for containers in contact with liquid contents and the other members bonded thereto have cracks or holes, liquid permeation undesirably occurs from those cracks or holes to cause peel-off between the roughened nickel-plated sheet 1 and the other members bonded thereto. In contrast, the present inventors have found that by controlling the structure of a plurality of nickel protrusions 12a to any one of the structures according to the first aspect and the second aspect described above, occurrence of such liquid permeation at bonding interfaces can be effectively suppressed.

More specifically, in the first aspect according to the present embodiment, the absolute value $C_{rate(Ni90\%\_Ni50\%)}$ of the change rate of the nickel occupancy to the change amount in height from the height position $D_{Ni90\%}$ with a nickel occupancy of 90% to the height position $D_{Ni50\%}$ with a nickel occupancy of 50% defines the structure of a plurality of nickel protrusions 12a close to the substrate 11 (or near the base end of a plurality of nickel protrusions 12a) in the entire roughened nickel layer 12. Specifically, it defines the change of a plurality of nickel protrusions 12a in the height direction when the structure of the plurality of nickel protrusions 12a in a height region from the interface with the substrate 11 to a region near the base end of the plurality of nickel protrusions 12a (hereinafter, also referred to as region near the interface) is evaluated in terms of the nickel occupancy. By controlling the change of the plurality of nickel protrusions 12a in the height direction in such a region near the interface to be relatively mild (namely, the absolute value $C_{rate(Ni90\%\_Ni50\%)}$ of the change rate of the nickel occupancy to the change in height is controlled to be relatively small), formation of relatively large gaps can be prevented in a region close to the substrate 11 in the entire roughened nickel layer 12. Thereby, occurrence of liquid permeation at bonding interfaces with other members caused by such large gaps can be effectively suppressed, and as a result, high anti-liquid permeability can be provided when the roughened nickel layer 12 is bonded to other members. Although the mechanism that liquid permeation is readily caused by relatively large gaps present in a region close to the substrate 11 (namely, a region near the base end of the plurality of nickel protrusions 12a) is not completely clarified, the following factors can be considered, for example. A first factor to be considered is a phenomenon that gaps are readily formed at interfaces with other members due to a locally reduced anchoring effect in the region close to the substrate 11, resulting in occurrence of liquid permeation. In short, such a phenomenon is considered as a factor of causing liquid permeation readily. A second factor to be considered is permeation of a liquid due to capillary action when the liquid invades into bonding interfaces from ends or from holes or ruptures of the bonding counterparts. At this time, if relatively large gaps are present near the base end of the plurality of nickel protrusions 12*a*, that is, if slightly flat regions are present at the bonding interface, the liquid readily permeates. In short, such a phenomenon is considered as a factor of causing liquid permeation readily. In contrast, the first aspect can effectively solve these problems.

Alternatively, the second aspect according to the present embodiment defines the average $R_{ave(Ni80\%\_Ni50\%)}$ of the equivalent circle diameters of the cross-sections of the nickel protrusions 12*a* from the height position $D_{Ni80\%}$ with a nickel occupancy of 80% to the height position $D_{Ni50\%}$ with a nickel occupancy of 50%, and the average $R_{ave(Ni80\%\_Ni50\%)}$ of the equivalent circle diameters also defines the structure of the plurality of nickel protrusions 12*a* close to the substrate 11 (namely, a region near the base end of the plurality of nickel protrusions 12*a*) in the entire roughened nickel layer 12. Specifically, focused on the equivalent circle diameters (widths) of the plurality of nickel protrusions 12*a* in a region near the base end, it defines the equivalent circle diameters (widths) of the plurality of nickel protrusions 12*a*. By controlling the equivalent circle diameters (widths) of the plurality of nickel protrusions 12*a* in a region near the base end to be relatively large, formation of relatively large gaps in a relatively deep region of the entire roughened nickel layer 12 can be prevented. Thereby, occurrence of liquid permeation at bonding interfaces with other members caused by such large gaps can be effectively suppressed, and as a result, high anti-liquid permeability can be provided when the roughened nickel layer 12 is bonded to other members.

In the present embodiment, the roughened nickel layer 12 can have not only increased adhesion to other members and increased anti-liquid permeability but also increased adhesion to the metal substrate 11 for the following reason. That is, if the roughened nickel layer 12 readily drops off from the metal substrate 11 in spite of high adhesion to other members demonstrated by formation of the roughened nickel layer 12, such drop-off of the roughened nickel layer 12 reduces the effect obtained from formation of the roughened nickel layer 12, i.e., high adhesion to other members to an insufficient level. For this reason, in the present invention, focused on the adhesion of the roughened nickel layer 12 to the metal substrate 11, the adhesion of the roughened nickel layer 12 to the metal substrate 11 is increased.

In particular, if the roughened nickel layer 12 has insufficient adhesion to the metal substrate 11, plating coating scraps (Ni powder) attributed to the drop-off of the roughened nickel layer 12 may be mixed into the production line for producing the roughened nickel-plated sheet 1 according to the present embodiment, causing contamination or breakdown of the production line, as well as production defects attributed to residual plating coating scraps in the production line. Furthermore, similarly, the drop-off of the roughened nickel layer 12 may cause contamination or breakdown of the production line or cause quality and functional defects of final products when the roughened nickel-plated sheet 1 according to the present embodiment is actually processed into products or parts. For this reason, it is also desired from this viewpoint that the roughened nickel layer 12 has high adhesion to the metal substrate 11.

Although it is sufficient in the present embodiment that the roughened nickel layer 12 satisfies any one of the structures according to the first aspect and the second aspect, it is preferred that the roughened nickel layer 12 satisfies both of the first aspect and the second aspect because the effect of the present invention can be further enhanced.

Moreover, in the present embodiment, preferably, the roughened nickel layer 12 satisfies the following conditions (5) to (10) because the effect of the present invention can be further enhanced:

(5) The maximum number of nickel protrusions 12*a* present is less than 150 protrusions/136.5 µm².

(6) The number $N_{0.3}$ of nickel protrusions 12*a* present at a height position located 0.3 µm from the base position BP toward the surface is 45 protrusions/136.5 µm² or less.

(7) The equivalent circle diameter $R_{0.3}$ of the cross-sections of the nickel protrusions 12*a* at a height position located 0.3 µm from the base position BP toward the surface is 0.6 µm or more.

(8) The 1 µm-or-less height position $D_{1\ \mu m}$ is 0.15 µm or more, where the height position from the base position BP at which the equivalent circle diameter reaches 1 µm or less for the first time when the equivalent circle diameter of the cross-sections of the nickel protrusions 12*a* gradually decreases from the base position BP toward the surface is defined as the 1 µm-or-less height position $D_{1\ \mu m}$.

(9) The absolute value $C_{rate(Ni80\%\_Ni50\%)}$ of the change rate of the nickel occupancy to the change amount in height from the height position $D_{Ni80\%}$ with a nickel occupancy of 80% to the height position $D_{Ni50\%}$ with a nickel occupancy of 50% is 65%/µm or less.

(10) The average $N_{ave(0.5\_1.5)}$ of the number of nickel protrusions 12*a* present at height positions located 0.5 to 1.5 µm from the base position BP toward the surface is 20 protrusions/136.5 µm² or more.

FIG. 5B shows the graph showing the relation between the position in the roughened nickel layer 12 in Example 1 from the base position BP and the number of nickel protrusions 12*a* within the observation field. The condition (5) above defines the value in maximum of the number of nickel protrusions 12*a* present, i.e., the maximum number $N_{max}$ of nickel protrusions 12*a* present when the roughened nickel layer 12 is measured across the height direction thereof as shown in the graph of FIG. 5B. In the present embodiment, the maximum number $N_{max}$ of nickel protrusions 12*a* present is preferably less than 150 protrusions/136.5 µm². This is because a significantly large number of nickel protrusions may result in protrusions each having a significantly small thickness. In Example 1 shown in FIG. 5B, the maximum number $N_{max}$ of nickel protrusions 12*a* present is 61 protrusions/136.5 µm². The maximum number $N_{max}$ of nickel protrusions 12*a* present is preferably 35 to 150 protrusions/136.5 µm², more preferably 40 to 140 protrusions/136.5 µm², still more preferably 40 to 130 protrusions/136.5 µm².

FIG. 5B shows the graph showing the relation between the position in the roughened nickel layer 12 in Example 1 from the base position BP and the number of nickel protrusions 12*a* within the observation field. The condition (6) above defines the number $N_{0.3}$ of nickel protrusions 12*a* present at a height position located 0.3 µm from the base position BP toward the surface as shown in the graph of FIG. 5B. In the present embodiment, preferably, the base ends of the nickel protrusions at a height position of 0.3 µm, i.e., in a region substantially close to the interface are connected to some extent not to form large gaps. Because a significantly large number of nickel protrusions at this height, i.e. nickel protrusions separated from each other may result in large gaps, the number $N_{0.3}$ of nickel protrusions 12a present is preferably 45 protrusions/136.5 μm² or less. In Example 1 shown in FIG. 5B, the number $N_{0.3}$ of nickel protrusions 12a present is 10 protrusions/136.5 μm². The number $N_{0.3}$ of nickel protrusions 12a present is preferably 45 protrusions/136.5 μm² or less, more preferably 40 protrusions/136.5 μm² or less. On the other hand, it is sufficient that the lower limit is 2 protrusions/136.5 μm² or more.

Figure 6B:
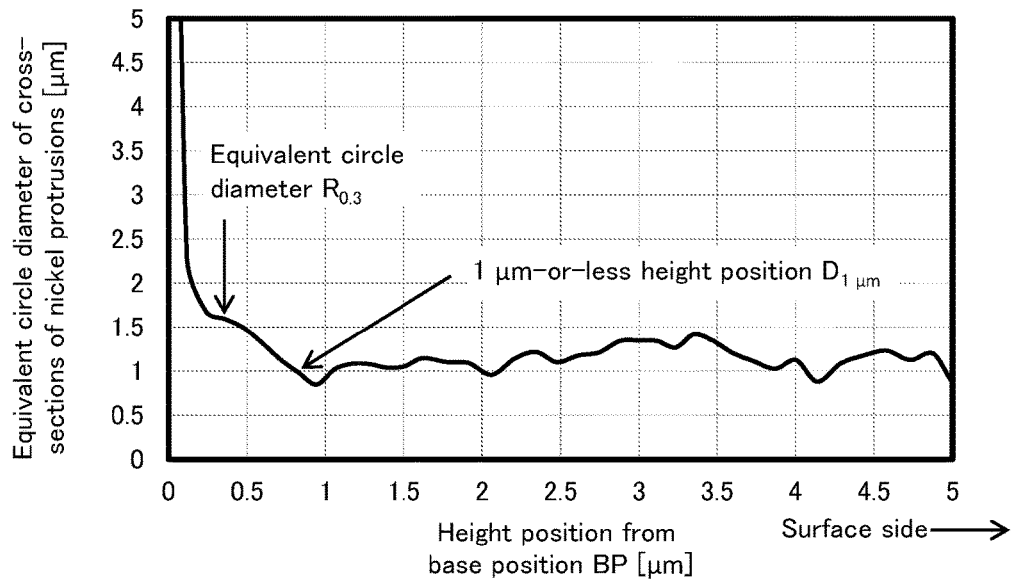
FIG. 6B is a graph showing the relation between the position in the roughened nickel layer 12 in Example 1 from the base position BP and the equivalent circle diameter of the cross-sections of the nickel protrusions 12a observed within the observation field.

FIG. 6B shows the graph showing the relation between the position in the roughened nickel layer 12 in Example 1 from the base position BP and the equivalent circle diameter of the cross-sections of the nickel protrusions 12a observed within the observation field. The condition (7) above defines the equivalent circle diameter $R_{0.3}$ of the cross-sections of the nickel protrusions 12a at a height position located 0.3 μm from the base position BP toward the surface as shown in the graph of FIG. 6B. Because a significantly small equivalent circle diameter of the nickel protrusions at a height position of 0.3 μm may result in thin nickel protrusions disposed with large gaps, the equivalent circle diameter $R_{0.3}$ is preferably 0.6 μm or more in the present embodiment. In Example 1 shown in FIG. 6B, the equivalent circle diameter $R_{0.3}$ is 1.6 μm. The equivalent circle diameter $R_{0.3}$ is preferably 0.6 μm or more, more preferably 0.7 μm or more. The upper limit is not particularly limited, and is usually 6 μm or less.

FIG. 6B shows the graph showing the relation between the position in the roughened nickel layer 12 in Example 1 from the base position BP and the equivalent circle diameter of the cross-sections of the nickel protrusions 12a observed within the observation field. The condition (8) above defines the 1 μm-or-less height position $D_{1\ \mu m}$, where the height position from the base position BP at which the equivalent circle diameter decreases to 1 μm or less for the first time when the equivalent circle diameter of the cross-sections of the nickel protrusions 12a gradually decreases from the base position BP toward the surface as shown in the graph of FIG. 6B is defined as the 1 μm-or-less height position $D_{1\ \mu m}$. In the present embodiment, preferably, a region including nickel protrusions having a large width extends to a higher position, and the 1 μm-or-less height position $D_{1\ \mu m}$ is preferably 0.15 μm or more. In Example 1 shown in FIG. 6B, the 1 μm-or-less height position $D_{1\ \mu m}$ is 0.82 μm. The 1 μm-or-less height position $D_{1\ \mu m}$ is preferably 0.15 μm or more, more preferably 0.17 μm or more, still more preferably 0.2 μm or more. The upper limit of the 1 μm-or-less height position $D_{1\ \mu m}$ is not particularly limited, and is usually 3.0 μm or less.

FIG. 5A shows the graph showing the relation between the position in the roughened nickel layer 12 in Example 1 from the base position BP and the nickel occupancy within the observation field. The condition (9) above defines the absolute value $C_{rate(Ni80\%\_Ni50\%)}$ of the change rate of the nickel occupancy to the change amount in height from the height position $D_{Ni80\%}$ with a nickel occupancy of 80% to the height position $D_{Ni50\%}$ with a nickel occupancy of 50% as shown in the graph of FIG. 5A. In the present embodiment, the absolute value $C_{rate(Ni80\%\_Ni50\%)}$ of the change rate of the nickel occupancy to the change amount in height is preferably in the range of 65%/μm or less. In Example 1 shown in FIG. 5A, the absolute value $C_{rate(Ni80\%\_Ni50\%)}$ of the change rate of the nickel occupancy to the change amount in height is 22.6%/μm. The absolute value $C_{rate(Ni80\%\_Ni50\%)}$ of the change rate of the nickel occupancy to the change amount in height is 65%/μm or less, preferably 10 to 65%/μm, more preferably 15 to 60%/μm, still more preferably 15 to 55%/μm, particularly preferably 23 to 55%/μm. The absolute value $C_{rate(Ni80\%\_Ni50\%)}$ of the change rate of the nickel occupancy to the change amount in height is determined from the following expression (β):

Absolute value $C_{rate(Ni80\%\_Ni50\%)}$ of change rate of nickel occupancy to change amount in height=|[(nickel occupancy (%) at height position $D_{Ni80\%}$ with nickel occupancy of 80%)−(nickel occupancy (%) at height position $D_{Ni50\%}$ with nickel occupancy of 50%)]÷[(height position $D_{Ni80\%}$ (μm) from base position BP with nickel occupancy of 80%)−(height position $D_{Ni50\%}$ (μm) from base position BP with nickel occupancy of 50%)]|   (Expression β)

FIG. 5B shows the graph showing the relation between the position in the roughened nickel layer 12 in Example 1 from the base position BP and the number of nickel protrusions 12a within the observation field. The condition (10) above defines the average $N_{ave(0.5\_1.5)}$ of the number of nickel protrusions 12a present at height positions of 0.5 to 1.5 μm from the base position BP toward the surface as shown in the graph of FIG. 5B. In the present embodiment, to further enhance the adhesion to other members, preferably, a larger number of nickel protrusions 12a are present at a position slightly away from the interface, i.e., at a position of 0.5 to 1.5 μm from the base position BP toward the surface. Preferably, the average $N_{ave(0.5\_1.5)}$ of nickel protrusions 12a present at height positions of 0.5 to 1.5 μm from the base position BP toward the surface is 20 protrusions/136.5 μm² or more. In Example 1 shown in FIG. 5B, the average $N_{ave(0.5\_1.5)}$ of nickel protrusions 12a present at height positions of 0.5 to 1.5 μm from the base position BP toward the surface is 35 protrusions/136.5 μm². The average $N_{ave(0.5\_1.5)}$ of nickel protrusions 12a present at height positions of 0.5 to 1.5 μm from the base position BP toward the surface is preferably 30 protrusions/136.5 μm² or more, more preferably 40 protrusions/136.5 μm² or more. On the other hand, the upper limit is not particularly limited, and may be 150 protrusions/136.5 μm² or less. A significantly high upper limit may result in nickel protrusions having a small thickness, and thus the upper limit is preferably 110 protrusions/136.5 μm² or less.

The number $N_{0.3}$ of nickel protrusions 12a present at a height position of 0.3 μm in the condition (6) above is an index indicating a preferred structure where the base ends of the nickel protrusions in a region substantially close to the interface are connected to some extent not to form larger gaps from the viewpoint of preventing liquid permeation at the bonding interface. In the condition (3) above, the number $N_{2.0}$ of nickel protrusions 12a present at a height position of 2.0 μm is an index indicating the number of protrusions having a height of 2.0 μm or more, which are particularly effective in increasing the adhesion to other members. In contrast, in the condition (10) above, the average $N_{ave(0.5\_1.5)}$ of nickel protrusions 12a present at height positions of 0.5 to 1.5 μm from the base position BP toward the surface is an index indicating that a larger number of protrusions are preferred in a position slightly away from the interface.

In the condition (10) above, the average $N_{ave(0.5\_1.5)}$ of nickel protrusions 12a present at height positions of 0.5 to 1.5 μm from the base position BP toward the surface can be calculated by dividing the sum of the number of nickel protrusions 12a present at the respective height positions from the height position of 0.5 μm to the height position of 1.5 μm by the total number of FIB-SEM images from each of which the corresponding number of nickel protrusions 12*a* present is obtained. The number of FIB-SEM images used in measurement can be determined according to the pitch for measurement.

The amount of the roughened nickel layer 12 deposited in the roughened nickel-plated sheet 1 according to the present embodiment is not particularly limited, and is preferably 1.34 to 45.0 g/m². To further enhance the adhesion to other members, the amount of the roughened nickel layer 12 deposited is more preferably 2.67 g/m² or more, still more preferably 5 g/m² or more. To further enhance the adhesion (plating adhesion) of the roughened nickel layer 12, the amount of the roughened nickel layer 12 deposited is more preferably 38.0 g/m² or less, still more preferably 32.0 g/m² or less, further still more preferably 31 g/m² or less. The amount of the roughened nickel layer 12 deposited can be determined by measuring the total nickel amount in the roughened nickel-plated sheet 1 with a fluorescence X-ray apparatus. When the roughened nickel layer 12 is formed on the metal substrate 11 with the undercoat metal-plated layer 13 interposed therebetween, the amount of the roughened nickel layer 12 deposited can be determined by measuring the total nickel amount in the roughened nickel-plated sheet 1 with a fluorescence X-ray apparatus, and then subtracting the nickel amount corresponding to the undercoat metal-plated layer 13 from the total nickel amount. Examples of the method of determining the nickel amount corresponding to the undercoat metal-plated layer 13 include a method of cutting the roughened nickel-plated sheet 1 and observing the cross-section with a scanning electron microscope (SEM) to measure the thickness of the undercoat metal-plated layer 13, and determining the nickel amount by conversion of the thickness of the undercoat metal-plated layer 13; a method of measuring the nickel amount on the metal substrate 11 with a fluorescence X-ray apparatus at a point of time when the undercoat metal-plated layer 13 is formed on the metal substrate 11; a method of determining the nickel amount from the electrodeposited amount calculated from the Coulomb amount when the undercoat metal-plated layer 13 is famed on the metal substrate 11 by plating; and the like.

In the present embodiment, the method of controlling the structure of a plurality of nickel protrusions 12*a* forming the roughened nickel layer 12 to any one of the structures according to the first aspect and the second aspect is not particularly limited. Examples thereof include a method of forming the roughened nickel layer 12 by a procedure described below, and the like.

Figure 8:
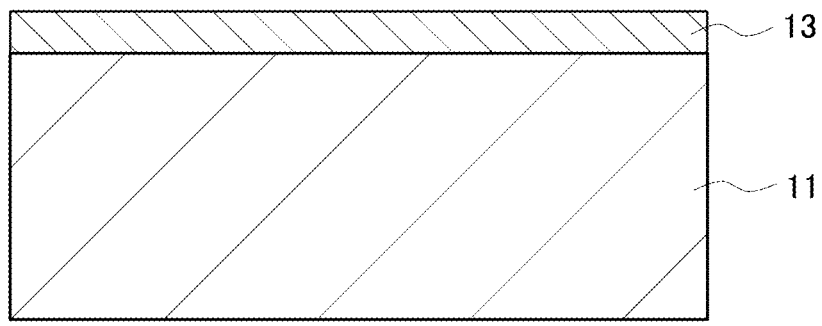
FIG. 8 is a schematic view (1) for illustrating one example of the method of preparing the roughened nickel-plated sheet according to the present embodiment.
Figure 9:
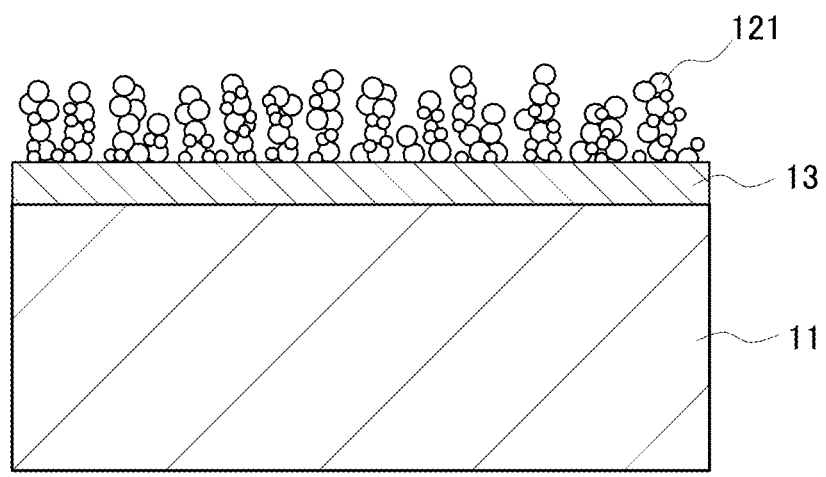
FIG. 9 is a schematic view (2) for illustrating one example of the method of preparing the roughened nickel-plated sheet according to the present embodiment.
Figure 10:
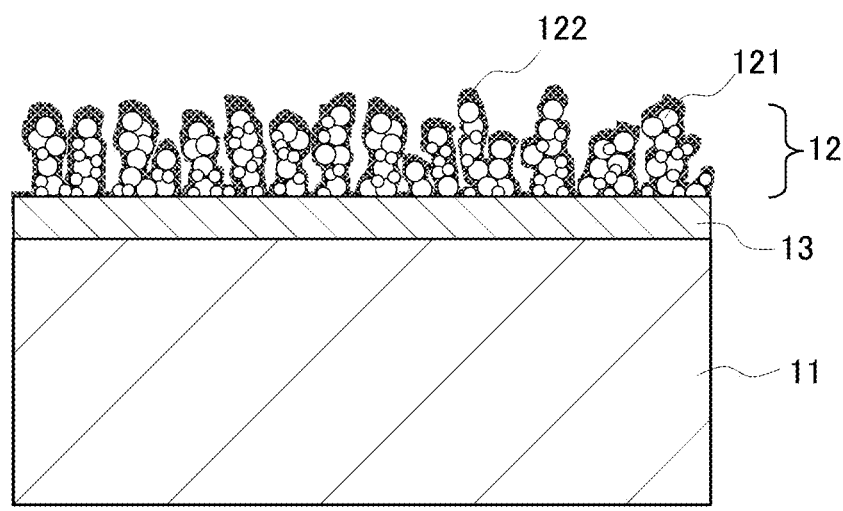
FIG. 10 is a schematic view (3) for illustrating one example of the method of preparing the roughened nickel-plated sheet according to the present embodiment.

Hereinafter, one example of the method of forming the roughened nickel layer 12 will be described with reference to FIGS. 8 to 10. First, to further enhance the adhesion between the metal substrate 11 and the roughened nickel layer 12 and to give anticorrosiveness according to its application, as shown in FIG. 8, an undercoat metal-plated layer 13 is formed on a metal substrate 11 as needed. The roughened nickel layer 12 may be formed directly on the metal substrate 11 without forming the undercoat metal-plated layer 13. In the next step, after or without forming the undercoat metal-plated layer 13, aggregated nickel granules 121 are deposited on the metal substrate 11 by roughened nickel plating as shown in FIG. 9. Thereafter, as shown in FIG. 10, nickel granules 121 are coated with a nickel coating 122 by further application of coating nickel plating. Thus, the roughened nickel layer 12 made of a plurality of nickel protrusions 12*a* is formed on the metal substrate 11 optionally with the undercoat metal-plated layer 13 interposed.

The conditions for the roughened nickel plating are not particularly limited. Preferred is use of a plating bath having a chloride ion concentration, a ratio of nickel ions to ammonium ions, and an electrical conductivity at 50° C. (hereinafter, also referred to as bath electrical conductivity) controlled to the ranges below. In other words, the chloride ion concentration is preferably 3 to 90 g/L, more preferably 3 to 75 g/L, still more preferably 3 to 50 g/L. The weight ratio of nickel ions to ammonium ions "nickel ion/ammonium ion" is preferably 0.05 to 0.75, more preferably 0.05 to 0.60, still more preferably 0.05 to 0.50, further still more preferably 0.05 to 0.30. The bath electrical conductivity at 50° C. is preferably 5.00 to 30.00 S/m, more preferably 5.00 to 20.00 S/m, still more preferably 7.00 to 20.00 S/m. When the chloride ion concentration is 10 g/L or more, any one of the structures according to the first aspect and the second aspect is more readily satisfied even with a smaller amount of roughened nickel plating deposited. By using a plating bath having a chloride ion concentration, a ratio of nickel ions to ammonium ions, and a bath electrical conductivity controlled within the ranges specified above, the plurality of nickel protrusions 12*a* forming the roughened nickel layer 12 can be structured to satisfy any one of the structures according to the first aspect and the second aspect, preferably both of the structures according to the first aspect and the second aspect. In the plating bath for forming a roughening plating, the bath electrical conductivity does not substantially vary in the range of 20 to 70° C., and the numeric value thereof measured at 30 to 60° C. is stable independent from the temperature.

Examples of the method of controlling the chloride ion concentration, the ratio of nickel ions to ammonium ions, and the bath electrical conductivity of the plating bath within these ranges include, but should not be limited to, a method of adding nickel sulfate hexahydrate, nickel chloride hexahydrate, and ammonium sulfate to the plating bath, and appropriately adjusting the blending amounts of these compounds. It is sufficient that the blending amounts thereof are adjusted, although not particularly limited, such that the chloride ion concentration, the ratio of nickel ions to ammonium ions, and the bath electrical conductivity of the plating bath fall within the ranges specified above. The concentration of nickel sulfate hexahydrate in the plating bath is preferably 10 to 100 g/L, more preferably 10 to 70 g/L, still more preferably 10 to 50 g/L. The concentration of nickel chloride hexahydrate is preferably 1 to 90 g/L, more preferably 1 to 60 g/L, still more preferably 1 to 45 g/L. The concentration of ammonium sulfate is preferably 10 to 130 g/L, more preferably 20 to 130 g/L, still more preferably 51 to 130 g/L, further still more preferably 70 to 130 g/L. Instead of ammonium sulfate, aqueous ammonia or ammonium chloride may be used to add ammonia to the nickel plating bath. The ammonia concentration in the plating bath is preferably 6 to 35 g/L, more preferably 10 to 35 g/L, still more preferably 16 to 35 g/L, further still more preferably 20 to 35 g/L. To control the chlorine ion concentration, a basic nickel carbonate compound, hydrochloric acid, sodium chloride, potassium chloride, or the like may be used.

When roughened nickel plating for depositing aggregated nickel granules 121 is pertained, the pH of the nickel plating bath is preferably 4.0 to 8.0 because the structure of a plurality of nickel protrusions 12*a* forming the roughened nickel layer 12 can be suitably controlled. A significantly high pH is likely to cause nickel ions in the bath to be famed into a hydrate, which causes plating failure. Thus, the upper limit is more preferably 7.5 or less, still more preferably 7.0 or less. A significantly low pH obstructs deposition of nickel particles in the form of secondary particles, and is likely to result in a usual form of deposition (flat plating). For this reason, formation of the roughened nickel layer is obstructed. Thus, the pH is more preferably 4.5 or more, still more preferably 4.8 or more, particularly preferably 5.0 or more. The pH together with the chloride ion concentration and the ratio of nickel ions to ammonium ions can be controlled with sulfuric acid, hydrochloric acid, aqueous ammonia, sodium hydroxide, or the like.

When roughened nickel plating for depositing aggregated nickel granules 121 is pertained, the current density is preferably 4 to 40 A/dm$^2$ because the structure of a plurality of nickel protrusions 12a forming the roughened nickel layer 12 can be suitably controlled. A high current density is likely to reduce deposition efficiency and to cause uneven plating and uneven control of surface roughness in a plated region. Thus, to ensure a large area of 100 cm$^2$ or more in particular, the current density is more preferably 30 A/dm$^2$ or less, still more preferably 25 A/dm$^2$ or less, particularly preferably 20 A/dm$^2$ or less. A low current density obstructs deposition of nickel particles in the form of secondary particles, and is likely to result in a usual form of deposition. For this reason, formation of the roughened nickel layer is obstructed. Thus, the current density is more preferably 6 A/dm$^2$ or more.

The temperature of the nickel plating bath during roughened nickel plating is not particularly limited. To suitably control the structure of a plurality of nickel protrusions 12a forming the roughened nickel layer 12, the temperature thereof is preferably 20 to 70° C., more preferably 25 to 60° C., still more preferably 30 to 60° C.

In the present embodiment, when roughened nickel plating for depositing aggregated nickel granules 121 is performed, it is preferred that plating be pertained under stirring of the nickel plating bath. Stirring of the nickel plating bath facilitates uniform deposition of nickel granules 121 on the metal substrate 11 while forming the aggregated nickel granules 121. Thereby, the structure of a plurality of nickel protrusions 12a forming the roughened nickel layer 12 can be more suitably controlled. Examples of the stirring method include, but should not be limited to, bubbling, pump circulation, and the like. The conditions for bubbling are as follows. Any gas can be used. From the viewpoint of general versatility, air is preferably used as the gas. As the timing to feed the gas, continuous feed is preferred for stable stirring. For the feed amount of the gas, preferred is 1 L/min or less relative to 2-L of the plating solution, for example, because an excessive stirring force obstructs formation of a desired roughened shape. For the mode for pump circulation, preferred is continuous circulation for stable stirring.

The amount of aggregated nickel granules 121 deposited by roughened nickel plating is not particularly limited. To more suitably control the structure of a plurality of nickel protrusions 12a forming the roughened nickel layer 12, the amount thereof is preferably 3.5 to 22.3 g/m$^2$, more preferably 4.4 to 22.3 g/m$^2$, still more preferably 8.9 to 22.3 g/m$^2$, further still more preferably 8.9 to 17.8 g/m$^2$. In particular, when a plurality of nickel protrusions according to the present embodiment is formed on a planarized substrate, the amount thereof is preferably 4.4 g/m$^2$ or more, more preferably 8.9 g/m$^2$ or more to further enhance the adhesion to other members.

In the production method according to the present embodiment, the aggregated nickel granules 121 are deposited by roughened nickel plating, followed by further coating nickel plating to coat the nickel granules 121 with the nickel coating 122. The coating nickel plating for coating the nickel granules 121 with the nickel coating 122 may be performed by any one of electrolytic plating and non-electrolytic plating methods. Preferred is formation by electrolytic plating.

When the coating nickel plating is performed by electrolytic plating, the following method can be used, for example: Using a nickel plating bath, which is a Watts bath having a bath composition consisting of 200 to 350 g/L of nickel sulfate hexahydrate, 20 to 60 g/L of nickel chloride hexahydrate, and 10 to 50 g/L of boric acid, nickel plating is deposited at a pH of 3.0 to 5.0, a bath temperature of 40 to 70° C., and a current density of 5 to 30 A/dm$^2$ (preferably 10 to 20 A/dm$^2$), followed by washing with water.

When the nickel granules 121 are coated with the nickel coating 122 by coating nickel plating, the deposition amount (coating amount) of the nickel coating is not particularly limited. To more suitably control the structure of a plurality of nickel protrusions 12a forming the roughened nickel layer 12, the deposition amount is preferably 1.7 to 17.8 g/m$^2$, more preferably 1.7 to 13.4 g/m$^2$, still more preferably 1.7 to 10.7 g/m$^2$, further still more preferably 1.7 to 8.9 g/m$^2$. When an undercoat nickel layer is formed as the undercoat metal-plated layer 13, the coating nickel plating not only provides coating of the nickel granules 121 with the nickel coating 122, but also partially contributes to growth of the undercoat nickel layer (increase in thicknesses of exposed portions of the undercoat nickel layer without nickel granules deposited). For this reason, in this case, the deposition amount is the total of the coating amount of the nickel coating 122 by the coating nickel plating and the amount of the undercoat nickel layer formed by the coating nickel plating.

In the present embodiment, to further enhance the adhesion between the metal substrate 11 and the roughened nickel layer 12, it is preferred that the undercoat metal-plated layer 13 be famed between the metal substrate 11 and the roughened nickel layer 12. The undercoat metal-plated layer 13 is preferably a nickel-plated layer or a copper plated layer, more preferably a nickel-plated layer. In particular, the nickel granules 121 famed by the roughened nickel plating are in a state of assemblies formed of particulate deposits aggregated into protrusions. From the viewpoint of the adhesion to other members, these assemblies are preferably spaced from each other. For this reason, in some cases, the entire surface of the metal substrate 11 may not be completely covered, or the thickness of the roughened nickel layer may be partially reduced. For this reason, to improve the suppressing effect against generation of rust in a steel sheet used as the metal substrate 11, for example, the undercoat metal-plated layer 13 is preferably disposed. For the purpose of such an anticorrosiveness improving effect, it is preferred that the metal substrate 11 be selected according to the application and be subjected to an undercoat plating treatment according to the selected metal substrate. When steel sheet or copper is used in the metal substrate 11, an undercoat nickel-plated layer or an undercoat copper-plated layer is preferably disposed as the undercoat metal-plated layer 13. When a nickel layer formed by electrolytic nickel plating is subjected to an undercoat plating treatment, such a nickel layer is highly compatible with the subsequent coating plating treatment, and can further enhance the adhesion of the plated roughened nickel layer 12. Although the plating adhesion effect is obtained only by the coating nickel plating treatment without the undercoat metal-plated layer 13, the undercoat metal-plated layer 13 is preferably formed to improve anticorrosiveness because nickel is likely to preferentially deposit on the nickel granules 121 in the coating nickel plating treatment. When the metal substrate 11 is a copper sheet, the plating adhesion of the roughened nickel layer 12 can be further enhanced by subjecting the copper sheet to an acid treatment as a pre-treatment.

The undercoat metal-plated layer 13 can be famed by preliminarily subjecting the metal substrate 11 to plating before forming the roughened nickel layer 12 on the metal substrate 11. When the undercoat metal-plated layer 13 is a nickel-plated layer, it may be famed by any one of electrolytic and non-electrolytic plating methods, and is preferably formed by electrolytic plating. For example, when roughened copper plating used in applications to print substrates is used to form the undercoat metal-plated layer for the roughened nickel layer, nickel preferentially deposits on projections of the roughened copper plating in the roughened nickel plating step, and the nickel coating cannot be famed on the entire roughened copper plating. This may result in reduced anticorrosiveness and reduced widths of the nickel protrusions, thus leading to difficulties in providing the aspects according to the present embodiment.

When the undercoat metal-plated layer 13 is a nickel-plated layer and the undercoat nickel-plated layer is formed by electrolytic plating, the following method can be used, for example: Using a nickel plating bath, which is a Watts bath having a bath composition consisting of 200 to 350 g/L of nickel sulfate hexahydrate, 20 to 60 g/L of nickel chloride hexahydrate, and 10 to 50 g/L of boric acid, nickel plating is deposited at a pH of 3.0 to 5.0, a bath temperature of 40 to 70° C., and a current density of 5 to 30 A/dm$^2$ (preferably 10 to 20 A/dm$^2$), followed by washing with water.

In formation of the undercoat metal-plated layer 13 in the roughened nickel-plated sheet 1 according to the present embodiment, the amount of the roughened nickel layer 12 deposited is preferably 26.7 g/m$^2$ or less, more preferably 2.6 to 22.3 g/m$^2$, still more preferably 2.6 to 17.8 g/m$^2$, particularly preferably 2.6 to 13.4 g/m$^2$ to further enhance the adhesion between the metal substrate 11 and the roughened nickel layer 12.

When the undercoat metal-plated layer 13 is famed, although the total amount of the roughened nickel layer 12 and the undercoat metal-plated layer 13 deposited in the roughened nickel-plated sheet 1 according to the present embodiment is not particularly limited, to further enhance the adhesion of the roughened nickel layer 12 to the metal substrate 11 and the adhesion to other members, the total amount thereof is preferably 5.0 to 50.00 g/m$^2$, more preferably 8.9 to 50.00 g/m$^2$, still more preferably 13.35 to 45.00 g/m$^2$, particularly preferably 13.35 to 40.00 g/m$^2$. The total of the roughened nickel layer 12 and the undercoat metal-plated layer 13 deposited can be determined by measuring the total nickel amount in the roughened nickel-plated sheet 1 using a fluorescence X-ray apparatus.

As described above, according to the present embodiment, by using a method of coating the nickel granules 121 with the nickel coating 122 by depositing aggregated nickel granules 121 on the metal substrate 11 by roughened nickel plating as shown in FIG. 9, and then further performing coating nickel plating as shown in FIG. 10 and controlling the conditions for forming these, the structure of a plurality of nickel protrusions 12a forming the roughened nickel layer 12 can be controlled to a structure satisfying any one of the first and second aspects described above, and preferably, the structure of a plurality of nickel protrusions 12a forming the roughened nickel layer 12 can be controlled to a structure satisfying both of the first and second aspects described above.

In the roughened nickel-plated sheet 1 according to the present embodiment described above, favorable adhesion of the roughened nickel layer 12 to the metal substrate 11 and high adhesion to other members are provided, and liquid permeation at bonding interfaces is effectively suppressed, providing high anti-liquid permeability. For this reason, the roughened nickel-plated sheet 1 according to the present embodiment can be suitably used in applications of the roughened nickel-plated sheet bonded to other members, and can be used in a variety of containers, electronic device members (such as substrates), battery members required to have adhesion to a variety of members such as resins and active materials (such as outer casings, current collectors, and tab leads), for example. Among these, the roughened nickel-plated sheet 1 according to the present embodiment can be particularly suitably used in applications in which the roughened nickel-plated sheet is bonded to other members and suppression of liquid permeation at bonding interfaces therebetween is expected.

In particular, the roughened nickel-plated sheet 1 according to the present embodiment includes the roughened nickel layer 12 having high adhesion, in other words, having high adhesion to the substrate 11. Thus, even if such plated sheets overlap or contact each other, the roughened nickel layer 12 on the surface thereof is difficult to peel or drop. For this reason, the roughened nickel-plated sheet 1 according to the present embodiment can be suitably used as the roughened nickel-plated sheet 1 including the roughened nickel layer 12 on both outermost surfaces thereof shown in FIG. 1A.

On the other hand, when adhesion to other members is required for only one surface of the plated sheet, it is sufficient that the roughened nickel layer 12 is famed on only one surface as in the roughened nickel-plated sheet 1 shown in FIG. 1B. Although the surface of the substrate 11 without the roughened nickel layer 12 is present as one outermost surface of the roughened nickel-plated sheet 1, for example, when the substrate 11 is a steel sheet, the surface of the substrate may remain untreated, or may be subjected to a surface treatment such as nickel plating, zinc plating, chemical treatment, or the like according to its required properties. In particular, when alkali solution resistance is required, a roughened nickel-plated steel sheet is produced by forming a standard nickel-plated layer (e.g., a nickel-plated layer famed under the conditions for forming an undercoat nickel-plated layer described above) on the surface without the roughened nickel layer 12. Such a roughened nickel-plated steel sheet can be preferably used because both surfaces of the substrate 11 are coated with nickel layers.

When the roughened nickel-plated sheet 1 shown in FIG. 1B is produced, a roughened nickel-plated steel sheet including the roughened nickel layer 12 only on one surface thereof can be prepared by a method of performing a plating treatment without electrically conducting the surface where the roughened nickel layer 12 is not formed, in the roughened nickel plating step, or by a method of masking the surface where the roughened nickel layer 12 is not famed.

EXAMPLES

Hereinafter, the present invention will be more specifically described by way of Examples, but these Examples should not be construed as limitations to the present invention.

The properties were evaluated by the methods below.
<Nickel Amount>

In Examples, the nickel amounts in the undercoat nickel layer and the roughened nickel layer (nickel granules and nickel coating) were determined after the corresponding steps of forming the undercoat nickel layer, the nickel granules, and the nickel coating by measurement with a fluorescence X-ray apparatus. Specifically, after the undercoat nickel layer was formed, the nickel amount of the undercoat nickel layer was determined with a fluorescence X-ray apparatus. Subsequently, after the nickel granules were formed, the total nickel amount was determined with a fluorescence X-ray apparatus, and the difference between the determined total nickel amount and the nickel amount of the undercoat nickel layer was defined as the nickel amount of nickel granules. Furthermore, after the nickel coating was formed, the total nickel amount was determined with a fluorescence X-ray apparatus again, and the nickel amount of the nickel coating was determined by determining the difference between the total nickel amounts before and after formation of the nickel coating. The total nickel amount of the nickel granules and the nickel coating was determined as an amount of the roughened nickel layer deposited.

Here, when a metal sheet containing nickel, such as a stainless steel sheet or a nickel sheet, is used as the substrate, the nickel amounts in the respective layers cannot be measured with a fluorescence X-ray apparatus as described above. For this reason, the nickel amount of a predetermined undercoat nickel layer is determined using a substrate without nickel, such as a steel sheet, and under the same plating conditions, a metal sheet containing nickel, such as a stainless steel sheet or a nickel sheet, is used as the substrate and is electrolyzed. Thereby, the amount of nickel deposited can be determined.

Although the nickel amount was measured by the above method in Examples and Comparative Examples, the nickel amount can be measured by any other method, and the following method may be used. In Examples, in part, the following method was also used. In other words, first, the total nickel amount in the layers formed on the roughened nickel-plated sheet is determined by measuring the roughened nickel-plated sheet including the undercoat nickel layer, the nickel granules, and the nickel coating formed thereon with a fluorescence X-ray apparatus. In the next step, the roughened nickel-plated sheet is cut, and a cross-section thereof is observed with a scanning electron microscope (SEM) to measure the thickness of the undercoat nickel layer. The nickel amount is determined by converting the thickness of the undercoat nickel layer, and is defined as the nickel amount of the undercoat nickel layer. The total nickel amount of the nickel granules and the nickel coating is determined by subtracting the nickel amount of the undercoat nickel layer from the total nickel amount, and can be defined as the amount of the roughened nickel layer deposited. In particular, when coating nickel plating is performed, the coating nickel plating forms the roughened nickel layer 12 as the nickel coating 122 which covers the nickel granules 121, and partially forms the undercoat nickel layer. By the method described above, the nickel amount of the undercoat nickel layer can be determined in consideration of growth of the undercoat nickel layer (an increase in thickness) caused by the coating nickel plating.

Here, the boundary between the metal substrate and the undercoat nickel layer and that between the undercoat nickel layer and the roughened nickel layer when the cross-section was observed with a scanning electron microscope (SEM) were determined as shown in FIGS. 11 A and 11B. In other words, as shown in FIGS. 11 A and 11B, because the boundary between the metal substrate and the undercoat nickel layer can be clearly observed as shown in FIGS. 11 A and 11B, the position shown in FIGS. 11 A and 11B (the position represented by the lower dashed line) is defined as the boundary. On the other hand, as shown in FIGS. 11 A and 11B, the lowest position of the base end of the nickel protrusions made of secondary particles (the position represented by the upper dashed line) is defined as the boundary between the undercoat nickel layer and the roughened nickel layer. FIG. 11 FIGS. 11A and 11B is a diagram are diagrams illustrating the method of determining the boundary between the metal substrate and the undercoat nickel layer and that between the undercoat nickel layer and the roughened nickel layer in Examples and Comparative Examples. FIG. 11A and FIG. 11B show the same scanning electron microscope (SEM) photographs side by side, where the boundaries are represented by the respective dashed lines in FIG. 11B.

<Measurement of Roughened Nickel Sheet with Focused Ion Beam Scanning Electron Microscope (FIB-SEM)>

Using a focused ion beam scanning electron microscope (FIB-SEM), the roughened nickel-plated sheet was measured by Slice & View, which is a three-dimensional SEM observation method, to measure the structure (depressions and projections) of the roughened nickel layer 12 forming the roughened nickel layer 12. Specifically, a roughened nickel-plated sheet was buried in a resin, and was polished to expose a cross-section to be measured. A portion of the roughened nickel layer 12 to be analyzed was marked. In the next step, a position of the metal substrate 11 sufficiently lower than the marked position of the roughened nickel layer 12 was etched to faun a space for observation (see FIG. 3A). Using a focused ion beam scanning electron microscope (high resolution SEM apparatus with FIB), the space for observation famed above was repeatedly finely subjected to cross-section milling (Slice) with FIB and SEM observation (View) from the metal substrate 11 toward the roughened nickel layer 12 to capture successive SEM images. Thereafter, the captured images were reconstructed to obtain stereoscopic information on the structure in the substrate normal direction from the base position BP of the roughened nickel layer 12 toward the surface. The focused ion beam scanning electron microscope used was a product name "Helios G4" available from FEI Company, and the SEM measurement was performed at an accelerating voltage of 3 kV and a sample tilt angle of 52°. Although the field for the image to be measured itself had a width of about 19.5 μm and a length of about 13 the field actually observed corresponds to a region having a thickness of about 19.5 μm× and a length of about 16.5 μm because the sample was measured at a tilt angle of 52°. In the measurement, SEM measurement was performed while FIB processing was performed with a slice pitch of about 0.1 μm until the cumulative slice pitch reached 6 to 7 μm.

To convert each FIB-SEM image obtained by the measurement into an image for observation in the normal direction of the substrate surface, the length of the image in the longitudinal direction was corrected, and a central region (observation field) of the image (excluding ends of the image) having a width of 13 μm× a length of 10.5 μm was binarized. Noises were removed therefrom to obtain an image for analysis. Portions of 10 pixels or less were removed as noises (because 1 pixel corresponds to about 12.7 nm, for example, portions of 3×3 pixels (portions of less than an about 38 nm square) were removed as noises).

By image analysis of the obtained image for analysis, the values of items for analysis (the nickel occupancy, the number of nickel protrusions 12a present, the equivalent circle diameter of the nickel protrusions 12a, and the like) were obtained. Thereby, the data of the nickel occupancy, the number of nickel protrusions 12a present, and the equivalent circle diameter of the nickel protrusions 12a at any height from the base position BP of the roughened nickel layer 12 toward the surface was obtained. For the FIB-SEM images at the respective height positions, the results of image analysis were joined to measure the profiles in the height direction in the items for analysis. The base position BP and the items for analysis are defined as follows.

The base position BP is the height position closest to the substrate among the height positions at which the nickel occupancy is less than 99%.

The nickel occupancy is the area ratio (%) of portions where nickel is present within the observation field.

The number of nickel protrusions 12a present is the number of 11- or larger pixel groups corresponding to portions where nickel is present.

The equivalent circle diameter of the nickel protrusions 12a is a value (μm) obtained by calculating the circle diameter (μm) when each of 11- or larger pixel groups corresponding to portions where nickel is present is considered as a perfect circle having the same area, and averaging all the 11- or larger pixel groups corresponding to portions where nickel is present, which are observed within the observation field.

<Adhesion to Polypropylene Resin (PP Resin) (T-Peel Strength)>

Two test sheets having a width of 15 mm and a length of 50 mm were prepared by cutting each of the roughened nickel-plated sheets prepared in Examples and Comparative Examples, and were used as T-peel test pieces. The two T-peel test pieces were bent at a position of a length of 20 mm with an angle of 90°. In the next step, the surfaces of the T-peel test pieces including the roughened nickel layers were disposed to face each other. A polypropylene resin film having a width of 15 mm, a length of 15 mm, and a thickness of 60 μm (available from Mitsubishi Chemical Corporation, trade name "Modic"/polypropylene resin two-layer film, the bonded surfaces between the polypropylene resin and the T-peel test pieces were evaluated, and "Modic" (trade name) is an adhesive layer for stabilizing the test) was sandwiched between the test pieces. The workpiece was heat sealed at a temperature of 190° C. for a press time of 5 seconds under a heat sealing pressure of 2.0 kgf/cm$^2$ to bond the two T-peel test pieces with the polypropylene resin film interposed therebetween. The interposed polypropylene resin film was disposed at one end of each T-peel test sample in the length direction, and the entire polypropylene resin film served as the bonding surfaces. The T-peel test samples thus prepared were subjected to a tensile test using a tensile tester (available from ORIENTEC, Co. Ltd. universal material tester Tensilon RTC-1350A) to measure the peel load (T-peel strength). The conditions for measurement were room temperature and a tensile rate of 10 mm/min. It can be determined that a higher T-peel strength indicates higher adhesion to the resin. A thickness of 8 N/15 mm or higher is determined as A, and a thickness of 10 N/15 mm or higher is determined as AA.

<Adhesion of Roughened Nickel Layer>

First, as a reference sample, an adhesive tape (available from NICHIBAN Co., Ltd., trade name "CELLOTAPE (registered trademark)") bonded to a paper mat was prepared to measure lightness L* and chromaticities a* and b* using a spectrocolorimeter (product name "CM-5", available from KONICA MINOLTA, INC.). In the measurement, the CIE1976 L*a*b* color difference model was used.

An adhesive tape (available from NICHIBAN Co., Ltd., trade name "CELLOTAPE (registered trademark)") was applied to a region having a width of 24 mm and a length of 50 mm on each of the surfaces of the roughened nickel-plated sheets in Examples and Comparative Examples where the roughened nickel layer was famed, and a peel test using the applied adhesive tape was pertained according to the peel test method described in JIS H 8504. Thereafter, the adhesive tapes after the peel test were bonded to the same paper mats as that used in the reference sample, and were measured for the lightness L* and the chromaticities a* and b* in the same manner as above with a spectrocolorimeter. From the results of measurement of the lightness L* and chromaticities a* and b* of the reference sample preliminarily measured and those of the lightness L* and chromaticities a* and b* of each of the adhesive tapes after the peel test, the difference ΔE*ab (ΔE*ab=[(ΔL*)$^2$+(Δa*)$^2$+(Δb*)$^2$]$^{1/2}$) was calculated, and the adhesions of the roughened nickel layers were evaluated according to the following criteria. A smaller ΔE*ab indicates a smaller peel amount in the peel test, that is, indicates a higher remaining ratio of the roughened nickel layer after the peel test, and can be determined as higher adhesion to the substrate.

AA: ΔE*ab of less than 1
A: ΔE*ab of 1 or more and less than 10
F: ΔE*ab of 10 or more <Evaluation of Liquid Permeability when Bonded to Polypropylene Resin (PP Resin)>

The roughened nickel-plated sheets prepared in Examples and Comparative Examples were cut into test pieces for evaluation of liquid permeability having a width of 90 mm and a length of 140 mm. For each of the prepared test pieces for evaluation of liquid permeability, a marker sheet for an alkali aqueous solution (available from Macherey-nagel, pH test paper) having a width of 7 mm and a length of 7 mm was placed on the test piece, and a polypropylene resin film (available from Mitsubishi Chemical Corporation, trade name "Modic"/polypropylene resin two-layer film (the surface having "Modic" (trade name) as an adhesive layer was used as the bonding surface)) having a width of 110 mm, a length of 160 mm, and a thickness of 60 μm was placed on the marker sheet. With the marker sheet for an alkali aqueous solution sandwiched between the test piece and the resin film, heat sealing was pertained across the entire laminate using a laminate roll at a temperature of 150° C., a pressure of 0.6 MPa (checked with a pressure-sensitive paper), and a roll passing rate of 70 mm/sec. Thereafter, the product was cut into a circle having a diameter of 30 mm centered on the marker to prepare a sample for measurement in which the marker sheet for an alkali aqueous solution was sealed. The prepared sample for measurement was immersed in a 30 g/L of a formula 618-TK-2 aqueous solution available from Nippon Quaker Chemical, Ltd. as an alkali aqueous solution at 80° C. for 30 hours, and coloring of the marker sheet for an alkali aqueous solution in the sample for measurement after immersion (coloring caused by invasion of the alkali aqueous solution into the sample for measurement) was observed, and was evaluated according to the following criteria.

A: no coloring of the marker sheet for an alkali aqueous solution is observed.
B: coloring of the marker sheet for an alkali aqueous solution in a size smaller than 2 mm×2 mm is observed at corners.
F: coloring of the marker sheet for an alkali aqueous solution in a size equal to or larger than 2 mm×2 mm is observed.

Example 1

A steel sheet prepared by annealing a cold rolled sheet (thickness: 0.05 mm) of a low carbon aluminum-killed steel was prepared as a substrate, and was planarized (smoothed) by rolling to prepare a planarized steel sheet having a surface having an arithmetic average roughness Ra of 0.2 µm, which was measured with a contact stylus type surface roughness meter.

The prepared rolled steel sheet was subjected to alkaline electrocleaning and acid washing through immersion in sulfuric acid. Thereafter, using an undercoat nickel plating bath having the bath composition below, the steel sheet was subjected to electrolytic plating under the following conditions to faun an undercoat nickel layer on both surfaces of the steel sheet.

<Conditions for Undercoat Nickel Plating>
  bath composition: 250 g/L of nickel sulfate hexahydrate, 45 g/L of nickel chloride hexahydrate, 30 g/L of boric acid
  pH: 4.2
  bath temperature: 60° C.
  current density: 10 A/dm$^2$
  time for plating: 30 seconds In the next step, using a roughened nickel plating bath satisfying the following bath conditions, the steel sheet on which the undercoat nickel layers were famed was subjected to electrolytic plating (roughened nickel plating) under the following conditions to deposit nickel granules on the undercoat nickel layers disposed on both surfaces of the steel sheet.

<Conditions for Roughened Nickel Plating>
  concentration of nickel sulfate (hexahydrate) in the plating bath: 10 g/L
  concentration of nickel chloride (hexahydrate) in the plating bath: 10 g/L
  concentration of chloride ions in the plating bath: 3 g/L
  ratio of nickel ions to ammonium ion in the plating baths: nickel ion/ammonium ion (weight ratio)=0.17
  electrical conductivity at 50° C. of the plating bath (hereinafter, also referred to as bath electrical conductivity): 11.4 S/m
  pH: 6
  bath temperature: 50° C.
  current density: 8 A/dm$^2$
  time for plating: 120 seconds In the next step, using a coating nickel plating bath having the bath composition below, the steel sheet including the undercoat nickel layers on which nickel granules were deposited was subjected to electrolytic plating (coating nickel plating) under the following conditions to coat the nickel granules deposited on the undercoat nickel layers with the nickel coating. Thus, a roughened nickel-plated sheet in Example 1 was prepared.

<Conditions for Coating Nickel Plating>
  bath composition: 250 g/L of nickel sulfate hexahydrate, 45 g/L of nickel chloride hexahydrate, 30 g/L of boric acid
  pH: 4.2
  bath temperature: 60° C.
  current density: 8 A/dm$^2$
  time for plating: 24 seconds The prepared roughened nickel-plated sheet was measured and evaluated for the nickel amounts of the undercoat nickel layer, the nickel granules, and the nickel coating, observation with a focused ion beam scanning electron microscope (FIB-SEM), the adhesion of the roughened nickel layer, the adhesion to the polypropylene resin (PP resin), and liquid permeation when bonded to the polypropylene resin (PP resin). The results are shown in Table 1.

Example 2

A roughened nickel-plated sheet in Example 2 was prepared in the same manner as in Example 1 except that the conditions for the roughened nickel plating and the conditions for the coating nickel plating were varied as shown in Table 1, and was evaluated in the same manner as in Example 1. The results are shown in Table 1.

Example 3

A roughened nickel-plated sheet in Example 3 was prepared in the same manner as in Example 1 except that the conditions for the roughened nickel plating and the conditions for the coating nickel plating were varied as shown in Table 1, and was evaluated in the same manner as in Example 1. The results are shown in Table 1.

Example 4

A roughened nickel-plated sheet in Example 4 was prepared in the same manner as in Example 1 except that the conditions for the roughened nickel plating and the conditions for the coating nickel plating were varied as shown in Table 1, and was evaluated in the same manner as in Example 1. The results are shown in Table 1.

Example 5

A roughened nickel-plated sheet in Example 5 was prepared in the same manner as in Example 1 except that the conditions for the roughened nickel plating and the conditions for the coating nickel plating were varied as shown in Table 1, and was evaluated in the same manner as in Example 1. The results are shown in Table 1.

Example 6

A roughened nickel-plated sheet in Example 6 was prepared in the same manner as in Example 1 except that the conditions for the roughened nickel plating and the conditions for the coating nickel plating were varied as shown in Table 1, and was evaluated in the same manner as in Example 1. The results are shown in Table 1.

Comparative Example 1

A roughened nickel-plated sheet in Comparative Example 1 was prepared in the same manner as in Example 1 except that the conditions for the roughened nickel plating and the conditions for the coating nickel plating were varied as shown in Table 1, and was evaluated in the same manner as in Example 1. The results are shown in Table 1.

[Table 1]

TABLE 1

|  |  | Example 1 | Example 2 | Example 3 | Example 4 | Example 5 | Example 6 | Comparative Example 1 |
|---|---|---|---|---|---|---|---|---|
| Roughened nickel plating bath | Chloride ion concentration [g/L] | 3 | 3 | 3 | 36 | 33 | 16.6 | 3 |
|  | Ratio $Ni^+/NH_4^-$ | 0.17 | 0.17 | 0.17 | 0.15 | 0.15 | 0.2 | 0.82 |
|  | Bath electrical conductivity [S/m] | 11.4 | 11.4 | 11.4 | 15 | 13.8 | 13.8 | 3.6 |
| Conditions for roughened nickel plating | Bath temperature [° C.] | 50 | 50 | 50 | 50 | 50 | 50 | 30 |
|  | pH | 6.0 | 6.0 | 6.0 | 6.0 | 6.0 | 6.0 | 6.0 |
|  | Current density [Å/dm$^2$] | 8 | 8 | 12 | 16 | 13 | 13 | 15 |
|  | Treatment time [sec] | 120 | 120 | 80 | 52 | 55 | 55 | 23 |
| Conditions for coating nickel plating | Bath temperature [° C.] | 60 | 60 | 60 | 60 | 60 | 60 | 60 |
|  | pH | 4.2 | 4.2 | 4.2 | 4.2 | 4.2 | 4.2 | 4.2 |
|  | Current density [Å/dm$^2$] | 8 | 5 | 5 | 15 | 10 | 10 | 10 |
|  | Treatment time [sec] | 24 | 24 | 36 | 12 | 18 | 18 | 36 |
| Nickel amount (g/m$^2$) | Undercoat nickel layer | 8.9 | 8.9 | 8.9 | 8.9 | 8.9 | 8.9 | 8.9 |
|  | Nickel granules | 12.8 | 12.8 | 12.8 | 9.6 | 13.5 | 11.3 | 4.5 |
|  | Nickel coating | 5.7 | 3.6 | 5.3 | 5.3 | 5.5 | 5.5 | 10.7 |
|  | Roughened nickel layer | 18.5 | 16.4 | 18.1 | 14.9 | 19.0 | 16.8 | 15.2 |

TABLE 2

|  |  | Example 1 | Example 2 | Example 3 | Example 4 | Example 5 | Example 6 | Comparative Example 1 |
|---|---|---|---|---|---|---|---|---|
| Structure of roughened nickel layer | Absolute value $C_{rate(Ni90\%\_Ni50\%)}$ of change rate of nickel occupancy to change amount in height from height position $D_{Ni90\%}$ to height position $D_{Ni50\%}$ | 25.6 | 39.1 | 38.7 | 44.9 | 32.5 | 41.8 | 69.8 |
|  | Nickel occupancy $C_{2.0}$ [%] at height position of 2.0 μm | 48.9 | 31.7 | 38.6 | 39.0 | 34.4 | 36.7 | 32.0 |
|  | Number $N_{2.0}$ of nickel protrusions present at height position of 2.0 μm [protrusions/136.5 μm$^2$] | 61 | 52 | 47 | 43 | 44 | 54 | 72 |
|  | Average $R_{ave(Ni80\%\_Ni50\%)}$ of equivalent circle diameters of cross-sections of nickel protrusions | 1.08 | 0.9 | 0.89 | 0.77 | 1.81 | 0.85 | 0.56 |
|  | Maximum value $N_{max}$ of number of nickel protrusions present | 61 | 82 | 75 | 97 | 46 | 87 | 157 |
|  | Number $N_{0.3}$ of nickel protrusions present at height position of 0.3 μm [protrusions/136.5 μm$^2$] | 9 | 20 | 5 | 16 | 4 | 21 | 50 |
|  | Equivalent circle diameter $R_{0.3}$ [μm] of cross-sections of nickel protrusion at height position of 0.3 μm | 1.60 | 1.20 | 2.60 | 1.02 | 3.31 | 1.1 | 0.51 |
|  | 1 μm-or-less height position $D_{1\ \mu m}$ [μm] at which equivalent circle diameter reaches 1 μm or less for first time | 0.82 | 0.58 | 0.59 | 0.42 | 2.25 | 0.42 | 0.12 |
|  | Absolute value $C_{rate(Ni80\%\_Ni50\%)}$ of change rate of nickel occupancy to change amount in height from height position $D_{Ni80\%}$ to height position $D_{Ni50\%}$ | 22.6 | 33.8 | 39.7 | 40.8 | 33.8 | 41 | 68.4 |
|  | Average $N_{ave(0.5\_1.5)}$ of number of nickel protrusions present at height positions of 0.5 to 1.5 μm [protrusions/136.5 μm$^2$] | 35 | 70 | 52 | 77 | 15 | 75 | 119 |
| Evaluations | Adhesion to resin [N/15 mm] | AA | AA | AA | AA | A | AA | AA |
|  | Adhesion of roughened nickel layer | AA | AA | AA | AA | AA | AA | A |
|  | Evaluation on liquid permeability | A | A | A | A | A | A | B |

Tables 1 and 2 show that high adhesion of the plated layer to the substrate and high adhesion to other members were demonstrated, and high anti-liquid permeability when bonded to other member was also demonstrated in the roughened nickel-plated sheets according to Examples 1 to 6 in which the absolute value $C_{rate(Ni90\_50\%)}$ of the change rate of the nickel occupancy to the change amount in height from the height position $D_{Ni90\%}$ with a nickel occupancy of 90% to the height position $D_{Ni50\%}$ with a nickel occupancy of 50% was 65%/μm or less, the average $R_{ave(Ni80\%\_Ni50\%)}$ of equivalent circle diameters of cross-sections of the nickel protrusions from a height position $D_{Ni80\%}$ with a nickel occupancy of 80% to a height position $D_{Ni50\%}$ with a nickel occupancy of 50% was 0.6 μm or more, the nickel occupancy $C_{2.0}$ at a height position of 2.0 μm was 15% or more, and the number $N_{2.0}$ of nickel protrusions present at a height position of 2.0 μm was 20 protrusions/136.5 μm$^2$ or more.

In contrast, the adhesion of the plated layer to the substrate and the anti-liquid permeability when bonded to other members were insufficient in the roughened nickel-plated sheet according to Comparative Example 1 in which the absolute value $C_{rate(Ni90\%\_Ni50\%)}$ of the change rate of the nickel occupancy to the change amount in height from the height position $D_{Ni90\%}$ with a nickel occupancy of 90% to the height position $D_{Ni50\%}$ with a nickel occupancy of 50% was more than 65%/μm, and the average $R_{ave(Ni80\%\_Ni50\%)}$ of equivalent circle diameters of cross-sections of the nickel protrusions from a height position $D_{Ni80\%}$ with a nickel occupancy of 80% to a height position $D_{Ni50\%}$ with a nickel occupancy of 50% was less than 0.6 μm. In particular, although the roughened nickel-plated sheet in Comparative Example 1 had a certain level of anti-liquid permeability, the anti-liquid permeability in long-term use was insufficient, and the roughened nickel-plated sheet in Comparative Example 1 was not suitable for applications required for anti-liquid permeability over a long time.

Figure 12A:
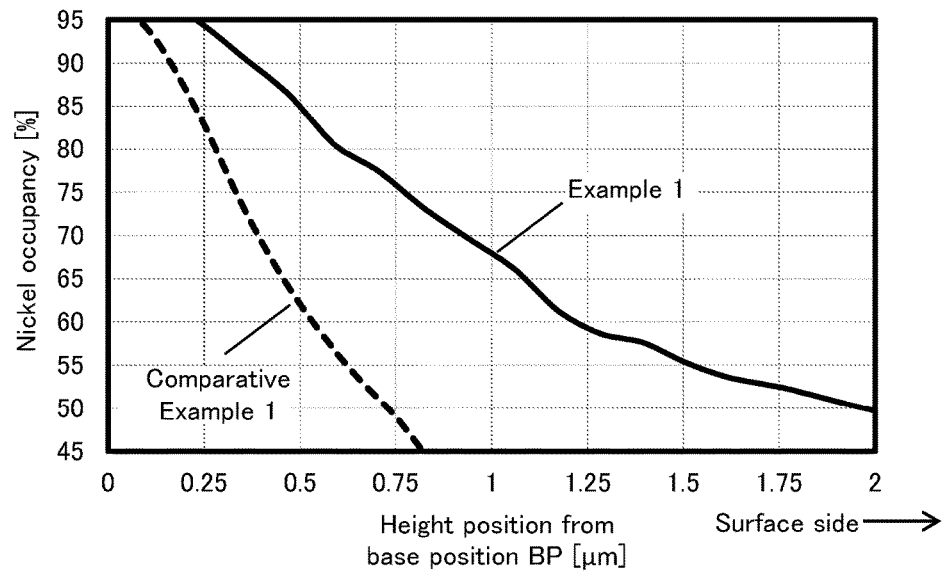
FIG. 12A is a graph showing the relation between the position in the roughened nickel layer 12 from the base position BP and the nickel occupancy in the roughened nickel layer 12 within the observation field (graph in which the base position BP is zoomed in) in Example 1 and Comparative Example 1, and 12B is a graph showing the relation between the nickel occupancy in the roughened nickel layer 12 within the observation field and the equivalent circle diameter of the cross-sections of the nickel protrusions 12a within the observation field in Example 1 and Comparative Example 1 (graph in which the nickel occupancy in the range of 50 to 80% is zoomed in).
Figure 12B:
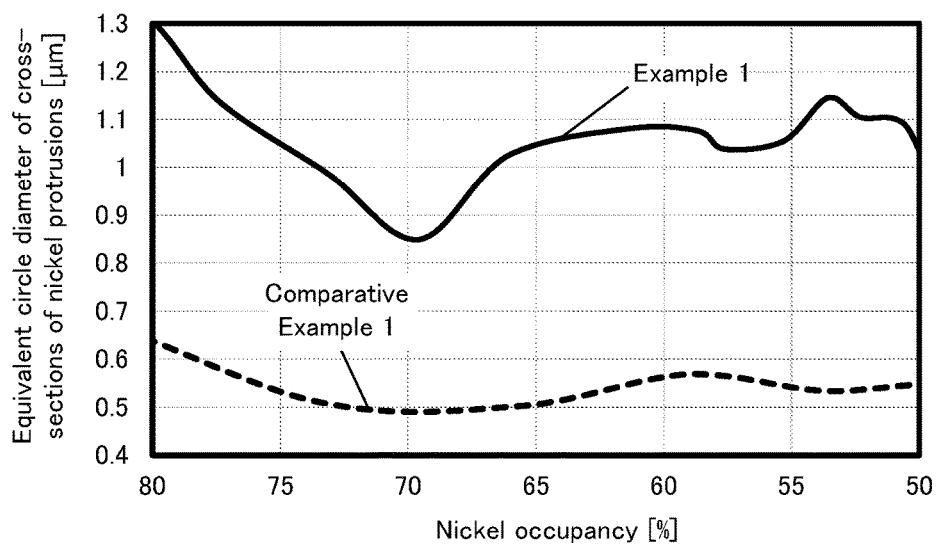

FIG. 12A shows a graph showing the relation between the position in the roughened nickel layer 12 from the base position BP and the nickel occupancy within the observation field in Example 1 and Comparative Example 1 (a graph in which the base position BP is zoomed in), and FIG. 12B shows a graph showing the relation between the nickel occupancy in the roughened nickel layer 12 within the observation field and the equivalent circle diameter of the cross-sections of the nickel protrusions 12a observed within the observation field in Example 1 and Comparative Example 1 (a graph in which a region where the nickel occupancy in the range of 50 to 80% is zoomed in).

REFERENCE SIGNS LIST 1, 1a . . . roughened nickel-plated sheet
11 . . . metal substrate
12 . . . roughened nickel layer
12a . . . nickel protrusions
121 . . . nickel granules
122 . . . nickel coating
13 . . . undercoat nickel layer

The invention claimed is:

1. A roughened nickel-plated sheet comprising a roughened nickel layer on at least one surface of a metal substrate as the outermost layer thereof, the roughened nickel layer being formed of a plurality of nickel protrusions,
   wherein when the roughened nickel-plated sheet is measured with a focused ion beam scanning electron microscope (FIB-SEM), and the structure of the roughened nickel layer is measured at height positions from images captured with the focused ion beam scanning electron microscope,
   the absolute value $C_{rate(Ni90\%\_Ni50\%)}$ of the rate of the change in nickel occupancy to the change in height from a height position $D_{Ni90\%}$ with a nickel occupancy of 90% to a height position $D_{Ni50\%}$ with a nickel occupancy of 50% is 65%/μm or less,
   the nickel occupancy $C_{2.0}$ at a height position located 2.0 μm from a base position of the roughened nickel layer toward the surface in the height direction is 15% or more, and
   the number $N_{2.0}$ of nickel protrusions present at the height position located 2.0 μm from the base position toward the surface is 20 protrusions/136.5 μm² or more.

2. The roughened nickel-plated sheet according to claim 1, wherein the metal substrate is a metal sheet or a metal foil made of one pure metal selected from the group consisting of Fe, Cu, Al, and Ni or a metal sheet or a metal foil made of an alloy containing one metal selected from the group consisting of Fe, Cu, Al, and Ni.

3. The roughened nickel-plated sheet according to claim 1, wherein the metal substrate is a steel sheet.

4. The roughened nickel-plated sheet according to claim 1, wherein the metal substrate has a thickness of 0.01 to 2.0 mm.

5. The roughened nickel-plated sheet according to claim 1, further comprising an undercoat nickel layer on the metal substrate,
   wherein the roughened nickel layer is formed on the metal substrate with the undercoat nickel layer interposed therebetween.

6. The roughened nickel-plated sheet according to claim 1, wherein the amount of the nickel plating deposited is 5.0 to 50.0 g/m².

7. The roughened nickel-plated sheet according to claim 1,
   wherein the roughened nickel layer is formed by depositing aggregated nickel granules on the metal substrate and applying a nickel coating onto the aggregated nickel granules, and
   the amount of the aggregated nickel granules is 3.5 to 22.3 g/m².

8. The roughened nickel-plated sheet according to claim 1,
   wherein the roughened nickel layer is formed by depositing aggregated nickel granules on the metal substrate and applying a nickel coating onto the aggregated nickel granules, and
   the deposition amount of the nickel coating is 1.7 to 17.8 g/m².

9. A roughened nickel-plated sheet comprising a roughened nickel layer on at least one surface of a metal substrate as the outermost layer thereof, the roughened nickel layer being formed of a plurality of nickel protrusions,
   wherein when the roughened nickel-plated sheet is measured with a focused ion beam scanning electron microscope (FIB-SEM), and the structure of the roughened nickel layer is measured at height positions from images captured with the focused ion beam scanning electron microscope,
   the average $R_{ave(Ni80\%\_Ni50\%)}$ of equivalent circle diameters of cross-sections of the nickel protrusions from a height position $D_{Ni80\%}$ with a nickel occupancy of 80% to a height position $D_{Ni50\%}$ with a nickel occupancy of 50% is 0.6 μm or more,
   the nickel occupancy $C_{2.0}$ at a height position located 2.0 μm from a base position of the roughened nickel layer toward the surface in the height direction is 15% or more, and
   the number $N_{2.0}$ of nickel protrusions present at the height position located 2.0 μm from the base position toward the surface is 20 protrusions/136.5 μm² or more.

10. The roughened nickel-plated sheet according to claim 9, wherein the metal substrate is a metal sheet or a metal foil made of one pure metal selected from the group consisting of Fe, Cu, Al, and Ni or a metal sheet or a metal foil made of an alloy containing one metal selected from the group consisting of Fe, Cu, Al, and Ni.

11. The roughened nickel-plated sheet according to claim 9, wherein the metal substrate is a steel sheet.

12. The roughened nickel-plated sheet according to claim 9, wherein the metal substrate has a thickness of 0.01 to 2.0 mm.

13. The roughened nickel-plated sheet according to claim 9, further comprising an undercoat nickel layer on the metal substrate,
   wherein the roughened nickel layer is formed on the metal substrate with the undercoat nickel layer interposed therebetween.

14. The roughened nickel-plated sheet according to claim 9, wherein the amount of the nickel plating deposited is 5.0 to 50.0 g/m².

15. The roughened nickel-plated sheet according to claim 9, wherein the roughened nickel layer is formed by depositing aggregated nickel granules on the metal substrate and applying a nickel coating onto the aggregated nickel granules, and the amount of the aggregated nickel granules is 3.5 to 22.3 g/m$^2$.

16. The roughened nickel-plated sheet according to claim 9, wherein the roughened nickel layer is formed by depositing aggregated nickel granules on the metal substrate and applying a nickel coating onto the aggregated nickel granules, and the deposition amount of the nickel coating is 1.7 to 17.8 g/m$^2$.

\* \* \* \* \*